US009339889B2

(12) United States Patent
Urata et al.

(10) Patent No.: US 9,339,889 B2
(45) Date of Patent: May 17, 2016

(54) HYBRID ULTRAPRECISION MACHINING DEVICE AND HYBRID ULTRAPRECISION MACHINING METHOD

(71) Applicant: PANASONIC CORPORATION, Osaka (JP)

(72) Inventors: Noboru Urata, Osaka (JP); Kimitake Okugawa, Osaka (JP); Yoshiyuki Uchinono, Osaka (JP); Takashi Shindo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 470 days.

(21) Appl. No.: 14/027,303

(22) Filed: Sep. 16, 2013

(65) Prior Publication Data
US 2014/0008340 A1    Jan. 9, 2014

Related U.S. Application Data

(63) Continuation of application No. PCT/JP2012/056949, filed on Mar. 13, 2012.

(30) Foreign Application Priority Data

Mar. 17, 2011    (JP) ................................. 2011-059486

(51) Int. Cl.
B23K 26/00    (2014.01)
B23P 23/06    (2006.01)
(Continued)

(52) U.S. Cl.
CPC ........... B23K 26/032 (2013.01); B23K 26/0093 (2013.01); B23K 26/08 (2013.01);
(Continued)

(58) Field of Classification Search
CPC ..... B23K 26/0093; B23P 23/00; B23P 23/06; B23P 25/006; B23Q 39/02
USPC ............ 219/121.67, 121.72; 29/33 R, 36, 39, 29/40, 41, 56.5; 408/22, 701; 700/98, 179, 700/159, 166; 82/173; 74/813 R, 813 C
See application file for complete search history.

(56) References Cited

U.S. PATENT DOCUMENTS 6,448,529 B1    9/2002    Hiraishi et al.
6,809,285 B2    10/2004    Masaki et al.
(Continued)

FOREIGN PATENT DOCUMENTS

JP    1-289606    11/1989
JP    9-225947    9/1997
(Continued)

Primary Examiner — Samuel M Heinrich
(74) Attorney, Agent, or Firm — Greenblum & Bernstein, P.L.C.

(57) ABSTRACT

There is provided a hybrid ultraprecision machining device for manufacturing a micro-machined product from a workpiece, the machining device comprising: an electromagnetic-wave-machining means for roughly machining the workpiece; a precision-machining means for precisely machining the roughly machined workpiece, the precision-machining means being equipped with a replaceable cutting tool selected from the group consisting of a planar tool, a shaper tool, a fly-cutting tool, a diamond-turning tool and a micro-milling tool; a shape-measurement means for measuring a shape of the workpiece upon use of the electromagnetic-wave machining means and the precision-machining means; and a control means for controlling the electromagnetic-wave-machining means or the precision-machining means, based on information on the shape of the workpiece, the shape being measured by the shape-measuring means.

16 Claims, 18 Drawing Sheets

(51) Int. Cl.
- *B23P 25/00* (2006.01)
- *B23Q 39/02* (2006.01)
- *B23K 26/03* (2006.01)
- *B23K 26/08* (2014.01)
- *B23P 15/24* (2006.01)
- *B23P 23/04* (2006.01)

(52) U.S. Cl.
CPC .......... *B23K 26/083* (2013.01); *B23K 26/0823* (2013.01); *B23K 26/0846* (2013.01); *B23P 15/24* (2013.01); *B23P 23/04* (2013.01); *B23P 23/06* (2013.01); *B23P 25/00* (2013.01); *B23P 25/006* (2013.01); *B23Q 39/02* (2013.01)

(56) References Cited

U.S. PATENT DOCUMENTS

| | | | | |
|---|---|---|---|---|
| 7,257,879 | B1 * | 8/2007 | Jancso | B23C 3/28 219/121.67 |
| 7,741,576 | B2 * | 6/2010 | Trimmer | B23H 1/04 204/224 M |
| 2012/0093674 | A1 | 4/2012 | Abe et al. | |
| 2012/0126457 | A1 | 5/2012 | Abe et al. | |
| 2014/0316552 | A1 * | 10/2014 | Shindo | B23P 23/04 700/179 |
| 2015/0025667 | A1 * | 1/2015 | Shindo | B23P 15/24 700/98 |

FOREIGN PATENT DOCUMENTS

| | | |
|---|---|---|
| JP | 11-138370 | 5/1999 |
| JP | 11-285924 | 10/1999 |
| JP | 2001-079854 | 3/2001 |
| JP | 2002-292487 | 10/2002 |
| JP | 2006-320994 | 11/2006 |
| JP | 2007-83285 | 4/2007 |
| JP | 2008-200761 | 9/2008 |

* cited by examiner

Metal mold for optical lens

Shaper machining

Fly-cut machining

Diamond-turning machining

Micro-milling machining

Vibration cutting (a)

Before cutting

(b)

Starting of cutting

(c)

During cutting

(d)

Completion of cutting

Onboard measurement

Onboard measurement

Laser machining

Grinding

Top plan view

HYBRID ULTRAPRECISION MACHINING DEVICE AND HYBRID ULTRAPRECISION MACHINING METHOD

CROSS-REFERENCE TO RELATED APPLICATIONS

This is a continuation application of International Application No. PCT/JP2012/056949, with an international filing date of Mar. 13, 2012, which claims priority of Japanese Patent Application No. 2011-059486 filed on Mar. 17, 2011, the content of which is incorporated herein by reference.

TECHNICAL FIELD

The present invention relates to a hybrid ultraprecision machining device and a hybrid ultraprecision machining method. More particularly, the present invention relates to the device and method for obtaining a micro-machined product from a workpiece by hybrid ultraprecision machining.

BACKGROUND OF THE INVENTION

In general industrial fields, machining processes have been traditionally performed to partially cut a material body (e.g., the body made of metal, wood or plastic) so that the body has a predetermined shape. For example, the cutting processes such as turning, milling and planning are performed to provide desired products or parts.

In a mass production of complicated products and parts, a metal mold for molding is generally manufactured by the machining process, for example. The metal mold is used to provide various types of molded products. Recently, electric devices and electronic devices have been decreasing their sizes and also have been improving their functions every year, which obviously requires miniaturization and high functionality of parts used in such devices. Therefore, the metal molds for molding such various parts or products having the requirements of the miniaturization and the high functionality are correspondingly required to be manufactured by machining with a sufficient accuracy of the miniaturization.

PATENT DOCUMENTS

Prior Art Patent Documents

PATENT DOCUMENT 1: JP-H09-225947
PATENT DOCUMENT 2: JP-2001-79854

DISCLOSURE OF THE INVENTION

Problems to be Solved by the Invention

The conventional machinings, however, cannot be satisfactorily addressed for the metal molds requiring the miniaturization of recent years. For example in a case where the metal molds are manufactured by machining difficult-to-cut materials such as ultrahard material and hardened steel, there is some concern that a lifetime of a machining tool is shortened, thus resulting in an increase in a manufacturing cost and a machining time. This becomes pronounced as the metal molds are more miniaturized and finer. For this reason, a shape design of the molded products (i.e., the shape designs of the metal mold or the final product) has to be changed from a practical point of view.

There can be an attempt that the type of the cutting tools is appropriately selected. However, the cutting tool has to be in contact with the workpiece during the cutting process, which still shortens the lifetime of the tool and also still takes much more time. There can be another attempt that a non-contact machining process (e.g., laser machining) is utilized. However, the laser machining is regarded as a heat generation process which is attributed to absorption of laser beam in the workpiece, and thus the laser machining is not appropriate for high accuracy machining. More particularly, the laser machining is generally regarded as being not used for fine products having the accurate requirements of surface roughness and shape.

Under these circumstances, the present invention has been created. That is, an object of the present invention is to provide a machining device and method suitable for the manufacture of a miniaturized product (particularly, a micro product with a fine structure).

Means for Solving the Problems

In order to achieve the above object, the present invention provides a hybrid ultraprecision machining device for manufacturing a micro-machined product from a workpiece, the machining device comprising:

an electromagnetic-wave-machining means for roughly machining the workpiece;

a precision-machining means for precisely machining the roughly machined workpiece, the precision-machining means being equipped with a replaceable cutting tool selected from the group consisting of a planar tool, a shaper tool, a fly-cut tool, a diamond-turning tool and a micro-milling tool; and a shape-measurement means for measuring a shape of the workpiece upon a use of the electromagnetic-wave machining means and the precision-machining means.

In a particularly preferred embodiment, the hybrid ultraprecision machining device of the present invention further comprises a control means for controlling the electromagnetic-wave-machining means or the precision-machining means, based on information on the shape of the workpiece, the shape being measured by the shape-measuring means.

In a preferred embodiment, a micro part of the micro-machined product has a dimension of several tens of nm to several mm, that is, of about 10 nm to about 15 mm, or about 10 nm to about 3 mm. For example, the dimension of the micro part of the micro-machined product is in the range of 10 nm to 500 μm, 50 nm to 1 μm, or 1 nm to 1 μm in some cases. Examples of the micro-machined products with the micro part dimensions include a metal mold for an optical lens, or an optical lens.

In the hybrid ultraprecision machining device, the precision-machining means may has an additional function of vibration cutting.

In another preferred embodiment, the electromagnetic-wave-machining means is a laser-machining means. In this embodiment, it is preferred that a table for mounting the workpiece, and/or the laser-machining means are/is movable, and thereby an angle of a laser incident light from the laser-machining means is adjustable with respect to the workpiece. It is also preferred that the laser-machining means comprises a plurality of laser generators which are capable of generating different laser wavelengths from each other.

In still another preferred embodiment, the hybrid ultraprecision machining device further comprises a computing means for creating data for a correction machining, based on "data measured by the shape-measurement means" and "machining path of the electromagnetic-wave-machining means and/or the precision-machining means, the path being obtained from a model for the micro-machined product".

The present invention also provides a hybrid ultraprecision machining method for manufacturing a micro-machined product from a workpiece, the method comprising:

(i) subjecting the workpiece to an electromagnetic-wave-machining process, and thereby roughly machining the workpiece; and (ii) subjecting the roughly machined workpiece to a cutting process selected from the group consisting of a planar machining, a shaper machining, a fly-cut machining, a diamond-turning machining and a micro-milling machining, and thereby precisely machining the roughly machined workpiece, wherein, a shape of the workpiece is measured upon at least one of the steps (i) and (ii).

In the hybrid ultraprecision machining method of the present invention, a shape of the workpiece is measured upon at least one of the steps (i) and (ii), and thereby the step (i) or (ii) are performed based on the measured shape.

In a preferred embodiment, a micro part of the manufactured micro-machined product has a dimension of several tens of nm to several mm, that is, of about 10 nm to about 15 mm, or about 10 nm to about 3 mm. For example, the dimension of the micro part of the micro-machined product is in the range of 10 nm to 500 μm, 50 nm to 1 μm, or 1 nm to 1 μm in some cases. By performing the hybrid ultraprecision machining method of the present invention, the micro-machined products with the micro part dimensions is manufactured as a metal mold for an optical lens, or an optical lens, for example.

A grinding process in addition to the cutting process may be performed in the precisely machining of the step (ii) of the hybrid ultraprecision machining method according to the present invention. The workpiece is at least subjected to a vibration cutting process in the step (ii).

In another preferred embodiment, an operation of at least one axis of a table for mounting the workpiece and an operation of at least one axis of a precision-machining means and/or an electromagnetic-wave-machining means are controlled in synchronization with each other.

In still another preferred embodiment, the electromagnetic-wave-machining process of the step (i) is performed by irradiating the workpiece with a laser. It is preferred in this embodiment that an orientation of the laser irradiation and/or the workpiece are/is adjusted according to a divergence angle of the laser, and thereby a vertical surface (or approximately vertical surface) of the workpiece is machined.

Effect of Invention

In accordance with the hybrid ultraprecision machining device and the hybrid ultraprecision machining method of the present invention, there can be obtained a micro product with a fine structure in a short time with high accuracy even when such product can be manufactured from the difficult-to-cut materials such as ultrahard material and hardened steel.

Specifically, the present invention involves a rough machining of workpiece by non-contact electromagnetic wave machining as a primary process (in which most of parts to be machined are removed by such rough machining), and subsequent precision machining of the roughly machined workpiece as a secondary process by using a replaceable cutting tool. Accordingly, the lifetime of the tool is increased, and also the machining time is significantly reduced as a whole. The present invention can shorten the processing time by about 50% to about 80% as compared to the case of prior art wherein the micro product with the fine structure is manufactured from the difficult-to-cut material only by using a cutting tool. The present invention makes it possible to not only achieve the significant reduction of the machining time by the electromagnetic wave machining serving as the rough machining, but also achieve higher accuracies of the surface roughness and shape by the precision machining using the replaceable cutting tool together with an onboard measurement.

As a result, the present invention can appropriately achieve the miniaturization and microfabrication of the metal mold without changing the shape design of the molded product (i.e., the shape of the final product, namely the shape of the metal mold). This leads to an achievement of the miniaturization and microfabrication of the electric and electronic devices as well as various parts to be used therein. For these reasons, a design of a desired fine product having a small size can be realized with no interruption of a manufacturing process itself, which enables the miniaturized electric and electronic devices with high performance to be suitably designed and developed.

MODES FOR CARRYING OUT THE INVENTION

Figure 1:
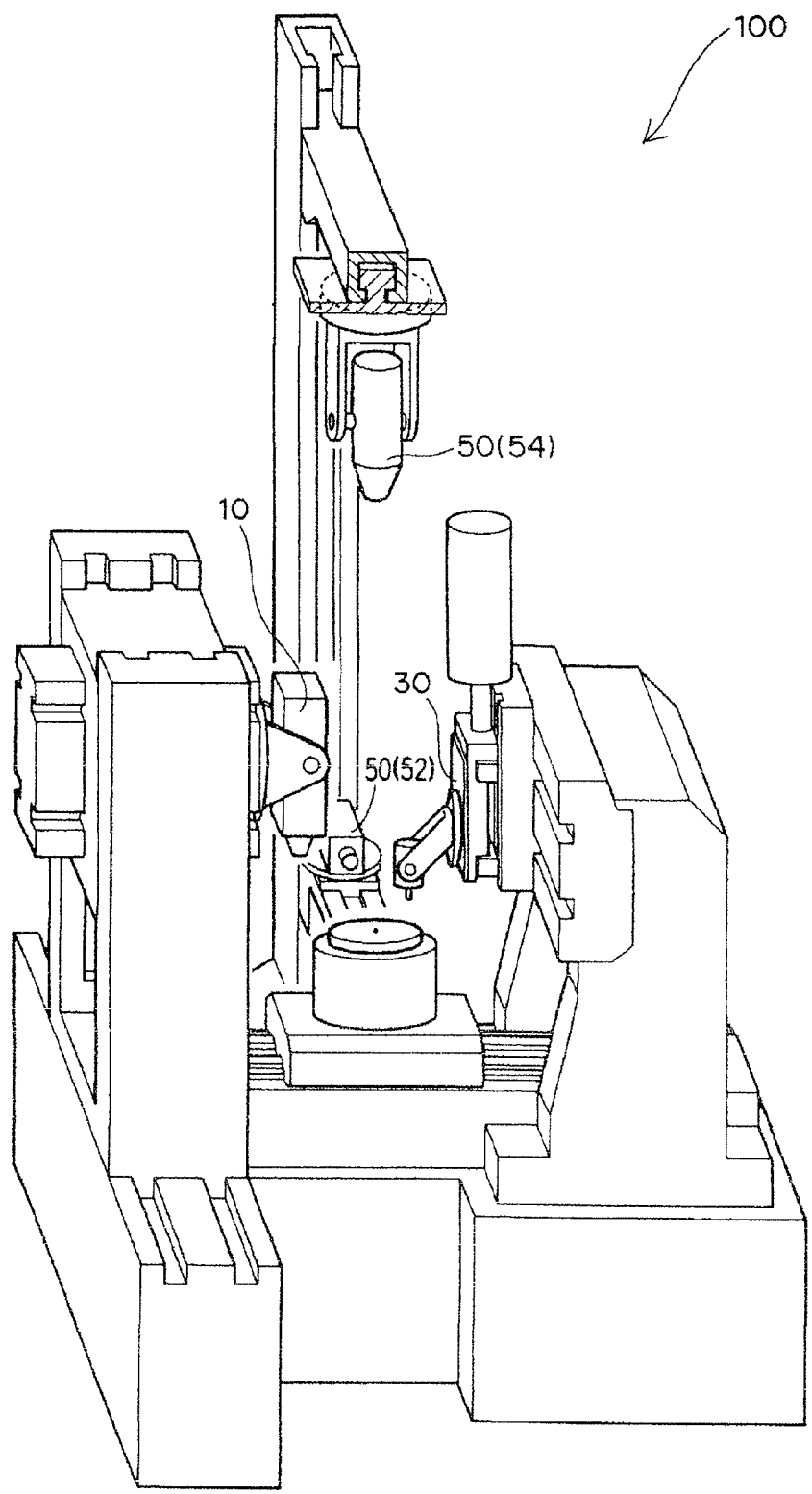
FIG. 1 is a perspective view schematically showing a constitution of a hybrid ultraprecision machining device according to the present invention.

With reference to the accompanying drawings, "hybrid ultraprecision machining device" and "hybrid ultraprecision machining method" according to the present invention will be described in detail. Various components or elements are shown schematically in the drawings with dimensional proportions and appearances being necessarily real, since they are merely for the purpose of making it easy to understand the present invention.

[Hybrid Ultraprecision Machining Device of the Present Invention]

The present invention provides a hybrid ultraprecision machining device for manufacturing a micro-machined product from a workpiece. As schematically shown in FIG. 1, the hybrid ultraprecision machining device 100 of the present invention comprises:

an electromagnetic-wave-machining means 10 for roughly machining the workpiece;

a precision-machining means 30 for precisely machining the roughly machined workpiece, the precision-machining means 30 being equipped with a replaceable cutting tool selected from the group consisting of a planar tool, a shaper tool, a fly-cut tool, a diamond-turning tool and a micro-milling tool; and a shape-measurement means 50 for measuring a shape of the workpiece upon use of the electromagnetic-wave-machining means 10 and the precision-machining means 30.

The hybrid ultraprecision machining device of the present invention is characterized by being equipped with the electromagnetic-wave-machining means 10 serving to perform a rough machining, the precision-machining means 30 serving to a precision machining of the roughly workpiece by means of the cutting tool suitable for a micro machining (especially suitable for the micro machining of the roughly machined workpiece), and the shape-measurement means 50 serving to measure the shape of the workpiece upon the above machinings. See FIG. 2 as well as FIG. 1.

Figure 3:
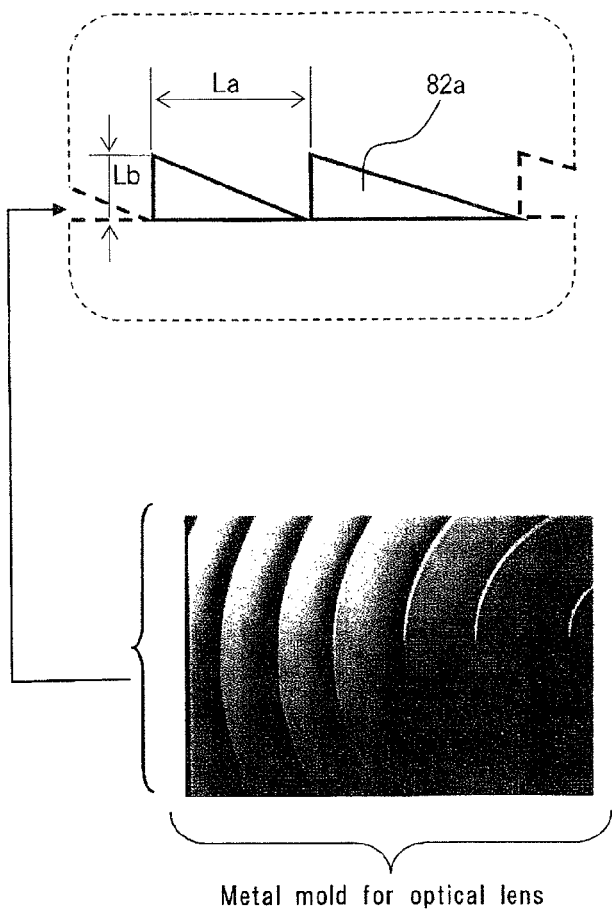
FIG. 3 shows a schematic diagram and an electron micrograph for explaining the size of a micro part of a micro-machined product.

The term "hybrid ultraprecision machining" as used in the present specification is intended for such an embodiment that the micro product with the fine structure is manufactured by a combination of "electromagnetic wave" and "precision machine", the dimension "La" or "Lb" (see FIG. 3) of the micro part of the product being in the range of several tens of nm to several mm, that is, in the range of about 10 nm to about 15 mm or about 10 nm to about 3 mm, more specifically in the range of several tens of nm to several tens of μm such as 10 nm to 500 μm and about 50 nm to 1 μm, or about 1 nm to about 1 μm in some cases. Thus, the term "ultraprecision machining" as used herein substantially means such an embodiment that an accurate machining of the workpiece is performed such that the machined workpiece has the micro part dimension "La" or "Lb" of several tens of nm to several mm as described above. In particular, the term "hybrid" as used herein substantially means a combination of two types of machinings, namely, "electromagnetic-wave machining" and "precision-machining".

As such, the hybrid ultraprecision machining device of the present invention is particularly appropriate for the manufacture of the micro product with the fine structure having the dimension of several tens of nm to several mm, that is, in the range of about 10 nm to about 15 mm, or about 10 nm to about 3 mm (for example in the range of several tens of nm to several tens of μm such as 10 nm to 500 and 50 nm to 1 μm, or in some cases 1 nm to 1 μm). The micro product with the fine structure to be manufactured may have a complicated multi-surface shape or curved-surface shape. Examples of the micro product with the fine structure (that is, the product that can be manufactured by the device of the present invention) may include a metal mold for optical lens (for example, a metal mold for micro-lens array), a metal mold for glass lens, a metal mold for precision-injection molding, a metal mold for precision-metal machining) in a case where the workpiece is made of ultrahard materials (cemented carbide), or metal materials such as hardened steel (quenched steel), non-iron (e.g., Bs, Cu, and/or Al) and preharden steel. Furthermore, the device of the present invention makes it possible to directly manufacture the products which are generally obtained by the above metal molds. For example, an optical lens (e.g., microlens array), a water-repellent plate, a mirror and a precision part can be manufactured, in which case the workpiece may be made of plastic material, metal material (e.g., aluminum steel), silicon material, glass material, mineral material, or polycrystalline diamond material. As such, the hybrid ultraprecision machining device of the present invention does not limit the materials of the workpiece, and can perform a hybrid ultraprecision machining on the workpiece of inorganic materials (e.g., glass material and/or metal material), or on the workpiece of organic materials (e.g., polymer material).

The electromagnetic-wave-machining means 10 of the hybrid ultraprecision machining device 100 according to the present invention is used for roughly machining the workpiece. The term "roughly machining" as used herein means that a workpiece body to be removed is roughly removed. Specifically, the term "roughly machining" used in the present invention substantially means that a ratio of the body part to be removed from the workpiece to the whole thereof is in the range of 70 to 95 volume %, preferably in the range of 80 to 95 volume %, and more preferably in the range of 90 to 95 volume %.

The electromagnetic-wave-machining means serves to generate a wave or light having a frequency of 10 kHz to 500 kHz so that the part of the workpiece body is removed by heating action. It is preferred that the electromagnetic-wave-machining means is a laser machining means. In this regard, the hybrid ultraprecision machining device 100 is preferably equipped with a laser generator capable of irradiating the workpiece with a laser light. In a case where the electromagnetic-wave-machining means 10 is the laser machining means, it is preferred that the type of the laser is a solid-state laser, a fiber laser, a gas laser, or the like.

Figure 4:
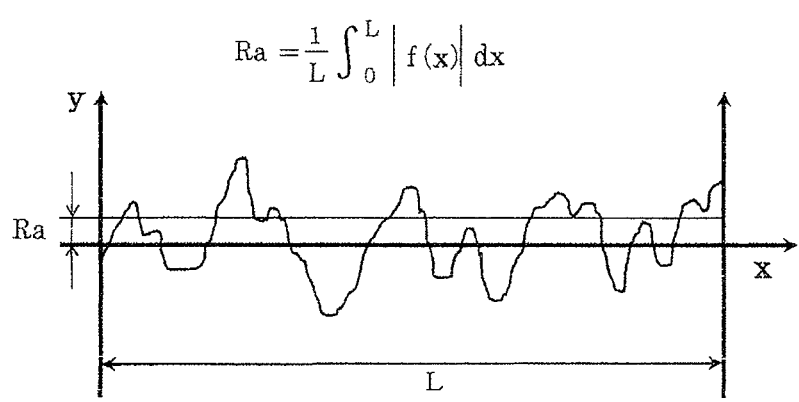
FIG. 4 is a diagram schematically showing the concept of arithmetic mean roughness (Ra).

The precision-machining means 30 of the hybrid ultraprecision machining device 100 according to the present invention is used for precisely machining the roughly machined workpiece. The term "precision machining" as used herein substantially means that the roughly machined workpiece is subjected to a cutting process under the cutting order of nm (for example, about 10 nm to 5000 nm, or about 50 nm to 1000 nm) so that the desired micro product with the fine structure is provided. It is particularly preferred that the "precision machining" produces the micro product with the fine structure having a surface roughness Ra of several nm to several hundreds of nm (for example, surface roughness Ra of about 2 nm to about 200 nm). The term "surface roughness Ra" as used herein corresponds to an arithmetic mean roughness. Thus, the surface roughness Ra substantially means a mean value calculated from the sum of absolute values of the deviations from the average line over the length L of an evaluation section that is set in the roughness curve as shown in FIG. 4 ("roughness curve" in this case corresponds to a section profile of the surface of the micro product with the fine structure). From another point of view regarding the surface roughness, the micro product with the fine structure can have a surface roughness Rz of 100 nm or less (that is, Rz=0 to 100 nm).

Figure 5:
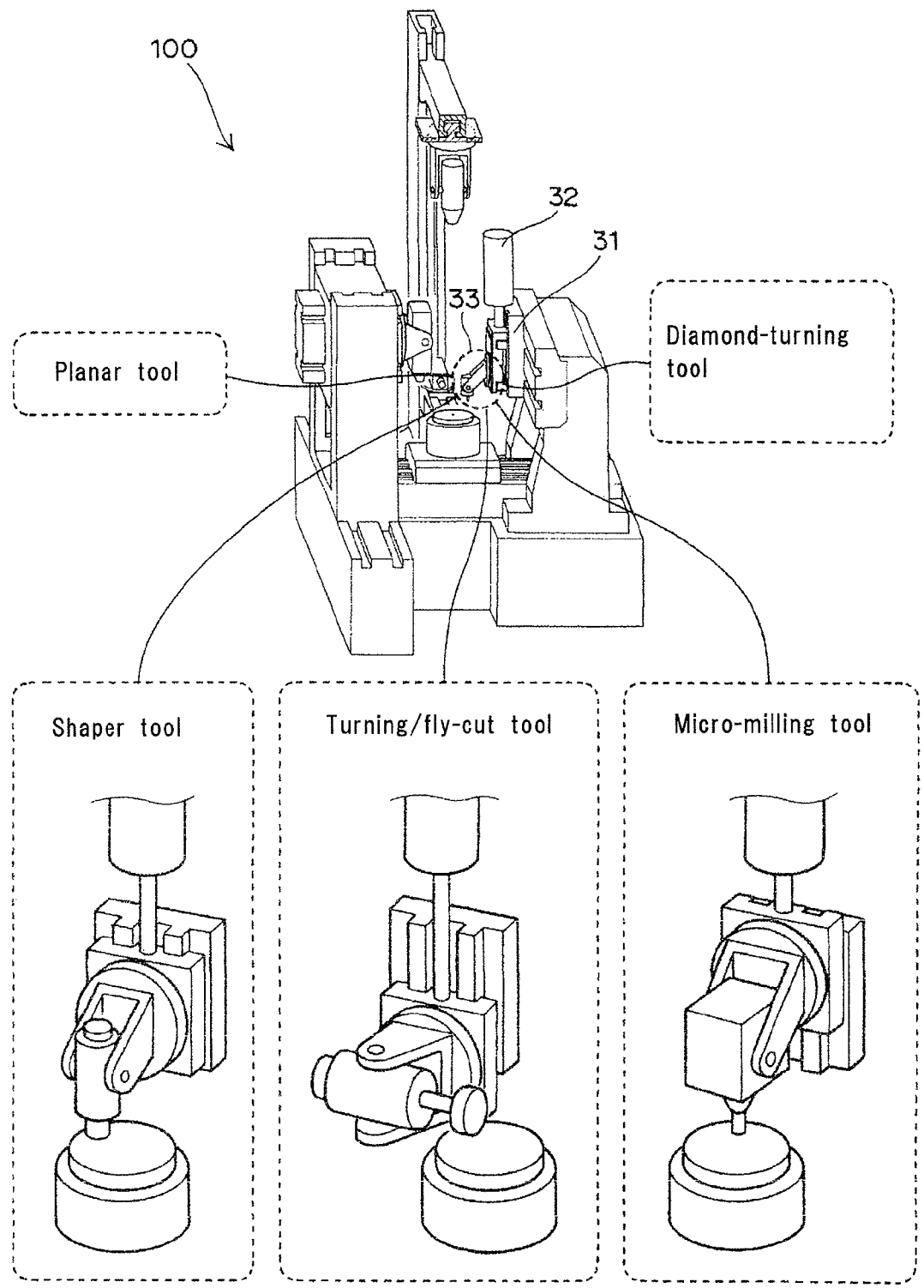
FIG. 5 is a perspective view schematically showing a precision-machining means/precision-machining process.

The precision-machining means 30 is equipped with the replaceable cutting tool selected from the group consisting of a planar tool, a shaper tool, a fly-cut tool, a diamond-turning tool and a micro-milling tool (see FIG. 5). That is, at least one cutting tool, preferably at least two cutting tool is/are provided in a replaceable state in the precision-machining means 30, and thereby at least one cutting process, preferably at least two cutting processes selected from the group consisting of a planar machining, a shaper machining, a fly-cut machining, a diamond-turning machining and a micro-milling machining is/are performed.

It is particularly preferred that at least one cutting tool selected from the group consisting of a shaper tool, a fly-cut tool, a diamond-turning tool and a micro-milling tool is replaceable in the precision-machining means.

As shown in FIG. 5, the precision-machining means 30 comprises a sliding platform 31 which has a function of a sliding movement in a horizontal direction, a motor for vertical-axis movement 32, and a machining head 33. The planar tool, the shaper tool, the fly-cut tool, the diamond-turning tool and/or the micro-milling tool may be replaceably disposed on the machining head 33. With respect to a replaceable mechanism of the precision-machining means, the cutting tool may be installed on the machining head, a feed mechanism, a table, or a main shaft by a screwing or fitting means. Alternatively, the cutting tool which has been in advance installed on the machining head or the like may be provided in such a movable state that the cutting tool is selectively used to perform the precision-machining of the workpiece.

Now, the cutting tools of the precision-machining means 30 will be described in detail.

Planar tool: This is a cutting tool for performing a so-called "planar machining (planing)". That is, the planar tool is a cutting tool for cutting the workpiece to produce a plane surface thereof. Typically, a byte tool is used as the planar tool. While a table with the workpiece mounted thereon is being moved horizontally, the byte tool is intermittently fed in the direction perpendicular to the movement direction of the table. As such, the planing process by the planar tool can be performed.

Figure 6:
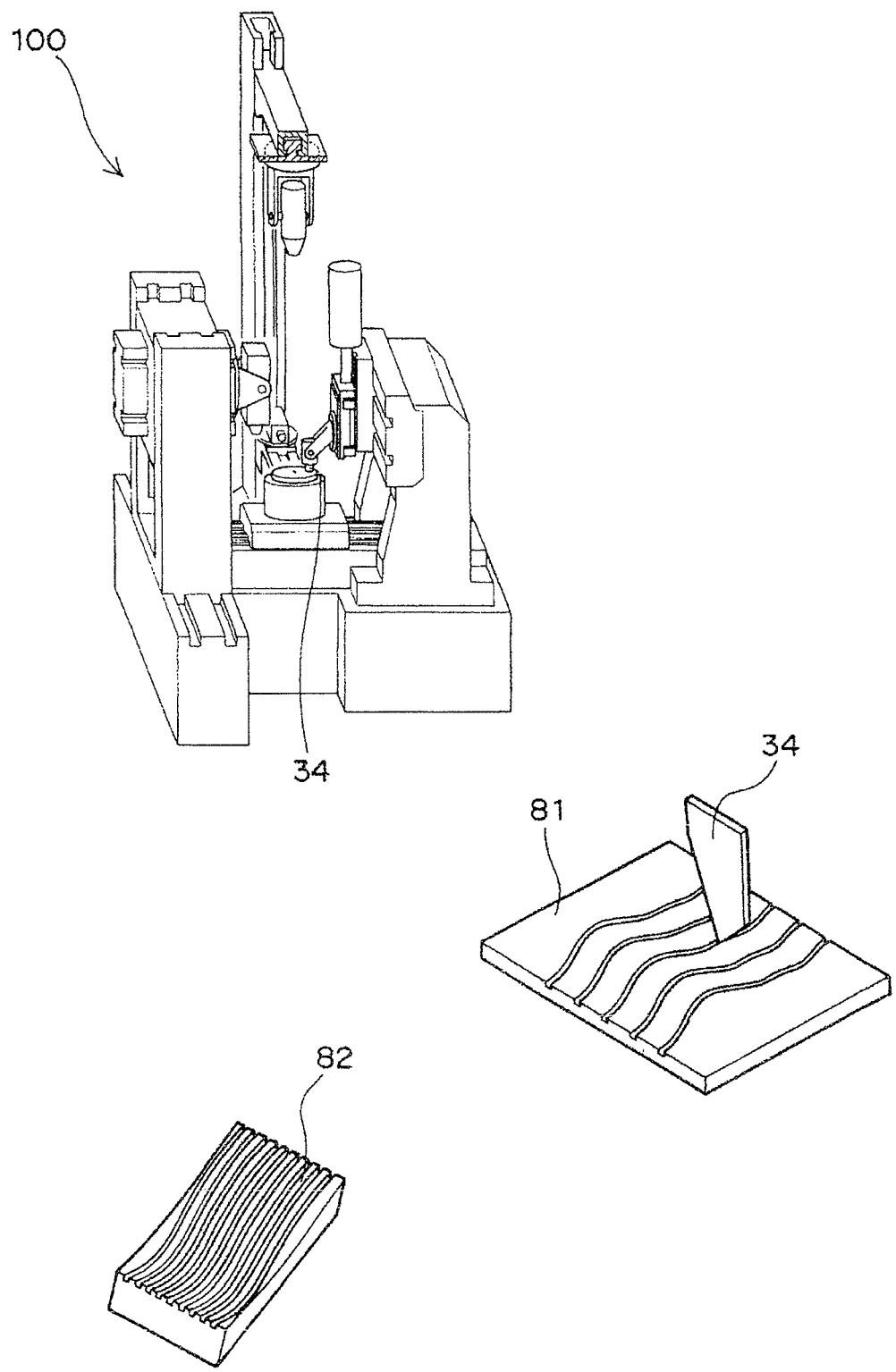
FIG. 6 is a perspective view schematically showing a shaper tool/shaper machining.

Shaper tool: This is a cutting tool for performing a so-called "shaper machining (shaping)". That is, a shaper tool is a cutting tool for cutting the workpiece to mainly produce a non-planar surface, for example to produce a groove (see FIG. 6). Typically, a byte tool is used as the shaper tool. While a table with the workpiece mounted thereon is intermittently fed in the direction perpendicular to the movement direction of the byte tool, the reciprocating byte is brought into contact with the workpiece. As such, the shaping process by the shaper tool can be performed.

Figure 7:
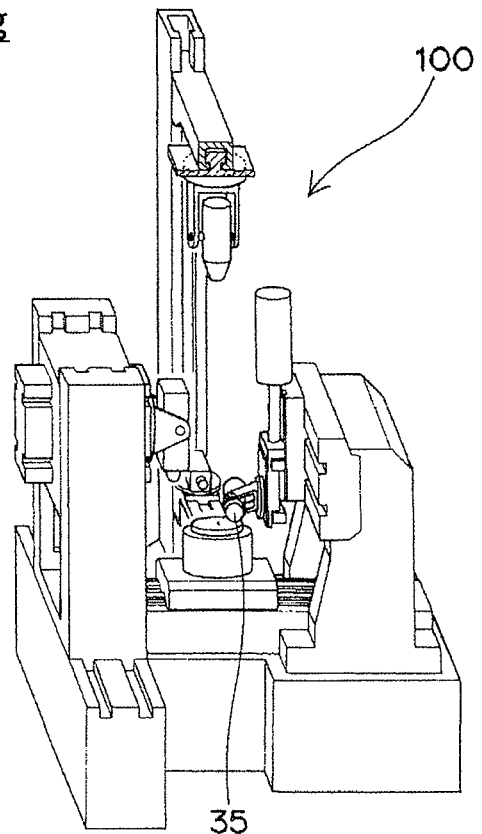
FIG. 7 is a perspective view schematically showing a fly-cut tool/fly-cut machining.
Figure 7:
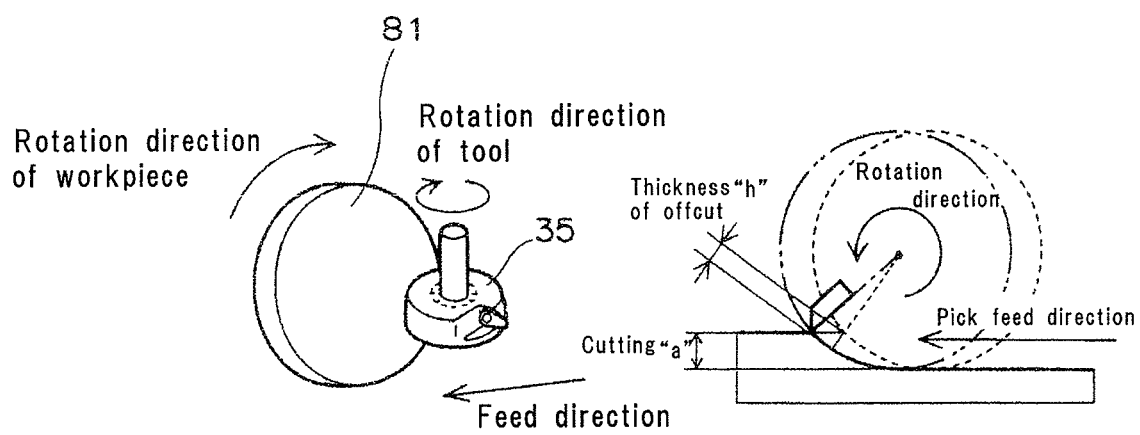

Fly-cut tool: This is a cutting tool for performing a so-called "fly-cut machining". Typically, a rotation tool is used as the fly-cut tool 35. While a rotation tool is being rotated, the rotation tool is fed to the workpiece (specifically, the workpiece with its position fixed) to cut the workpiece (see FIG. 7). The term "fly-cut" substantially means the same as the term "fly machining". However, the fly-cut may include such a machining mode that only one blade is used in the precision machining according to the present invention.

Figure 8:
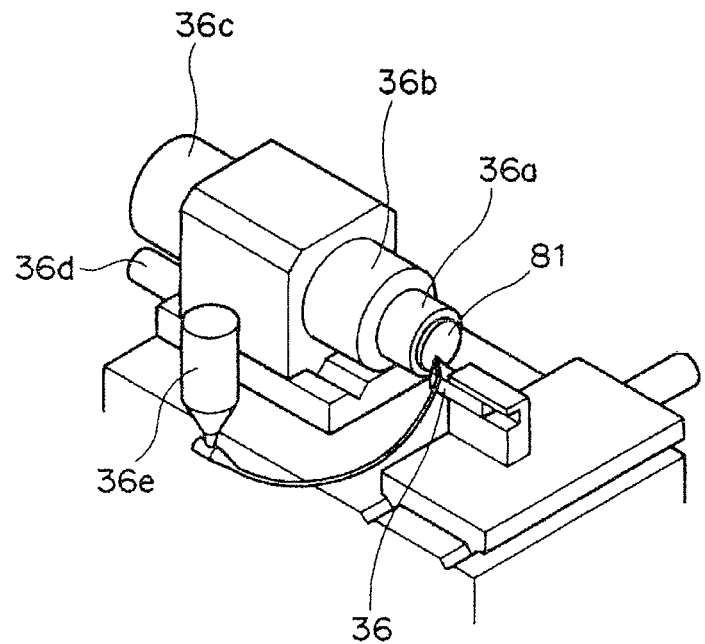
FIG. 8 is a perspective view schematically showing a diamond-turning tool/diamond-turning machining.
Figure 8:
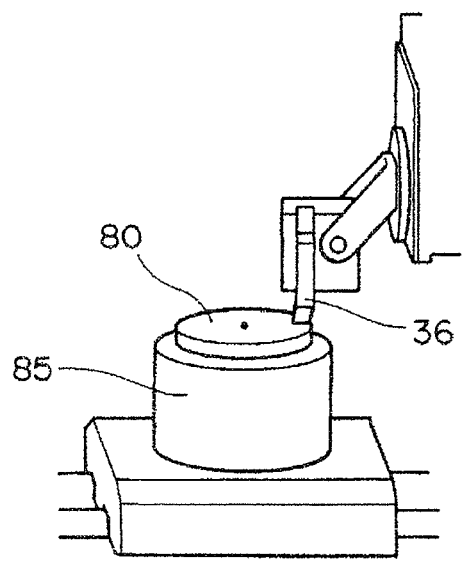

Diamond turning tool: This is a cutting tool for performing a so-called "single point diamond turning (SPDT)" or "ultra-precision turning machining". Typically, while the workpiece 81 is being rotated, a diamond tool 36 is brought into contact with the workpiece 81, and thereby the workpiece is machined so that it has the shape with its center positioned at the center of rotation (see FIG. 8).

Figure 9:
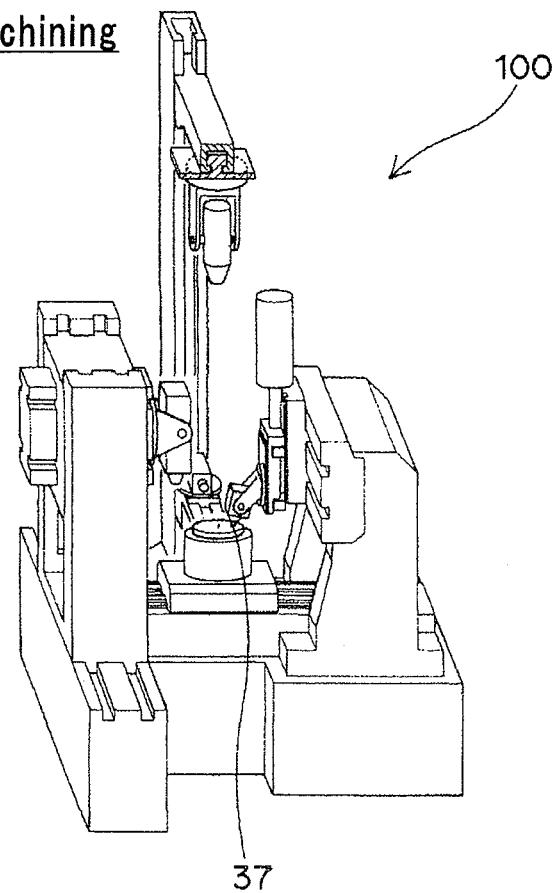
FIG. 9 is a perspective view schematically showing a micro-milling tool/micro-milling machining.
Figure 9:
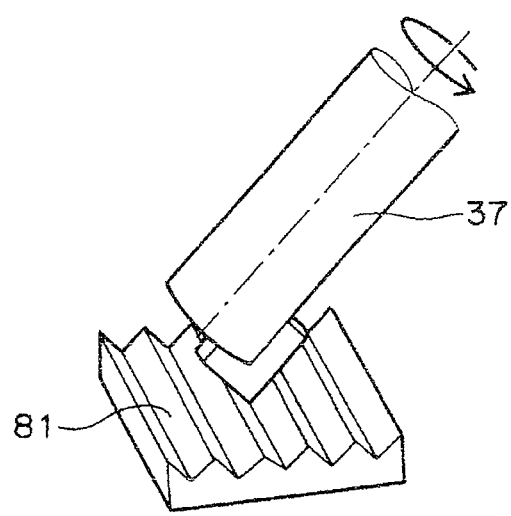

Micro milling tool: This is a cutting tool for performing a milling, for example "micro-milling". Typically, a rotation tool with a small diameter (for example, a diamond rotation tool) is used as the micro milling tool 37. While the rotation tool is being rotated, the rotation tool is brought into contact with the workpiece to reflect the shape of the tip edge of the tool blade in the workpiece or to form various shapes (see FIG. 9).

In the hybrid ultraprecision machining device 100 of the present invention, the precision-machining means 30 has an additional function of vibration cutting. That is, the above-mentioned cutting tool can be subjected to a vibration. For example, the cutting tool is attached to a driving piezoelectric element. The vibration cutting can provide the effects of "decreasing a cutting resistance", "preventing an adherence phenomenon in the tip edge of the tool blade" and "suppressing a distortion attributed to thermal action". The vibration cutting is preferably performed in a form of "ultrasonic wave elliptical vibration cutting". Specifically, the tip edge of the cutting tool is vibrated elliptically (see FIG. 10). The vibration cutting can effectively achieve a large reduction in the cutting resistance, a suppression of the generation of burr and chatter vibration, and a reduction in thickness of the chip.

The hybrid ultraprecision machining device 100 of the present invention comprises the shape-measurement means 50. The shape-measurement means 50 is used for an onboard measuring of the shape of the workpiece upon the use of the electromagnetic-wave-machining means 10 and the precision-machining means 30. The term "shape measurement" substantially means that the shape and/or position of the workpiece are/is measured at a point in time at least one of before, during and after the machining process.

Examples of the shape-measurement means may include "imaging means", "a detector using a laser light", and the like. The imaging means may be a CCD camera, an infrared camera, a near-infrared camera, a mid-infrared camera, or a X-ray camera, for example. The "detector using the laser light" may be a laser microscope, or a laser interferometer, for example. Alternatively, a white light interferometry is possible for performing the measurement of the shape. Furthermore, the "contact-measurement means" may be preferably used. For example, the shape-measurement means may be a measurement device using a probe (three-dimensional indicator). In this regard, scanning probe microscopes such as a scanning tunneling microscope and an atomic force microscope may be used, for example.

Figure 11A:
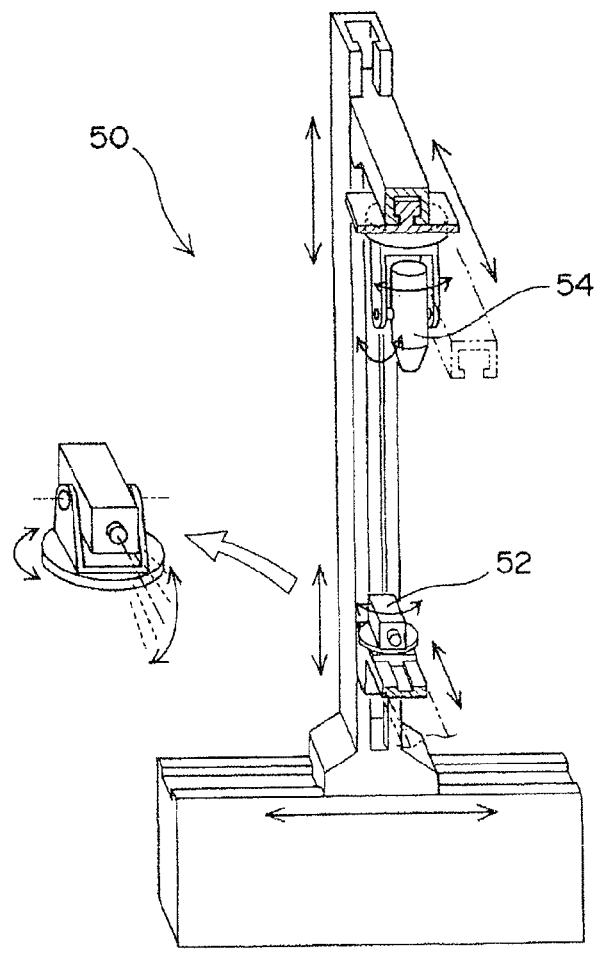
FIG. 11A is a perspective view schematically showing a shape-measurement means.

As shown in FIG. 11(a) and FIG. 1, the shape-measurement means 50 preferably includes a combination of "imaging means 52" and "detector 54 using the laser light". In this case, it is preferred that the position of the workpiece is identified by the "imaging means 52", and then the shape of the workpiece (especially, the shape of a part to be machined) is identified by the "detector 54 using the laser light".

Figure 11B:
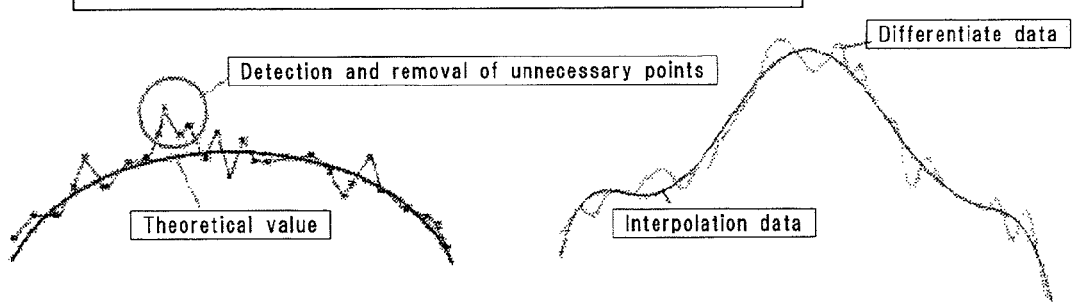
FIG. 11B is a perspective view schematically showing a creation of data for a correction machining.

Information on the shape and/or position of the workpiece measured by the shape measurement means 50 is fed back to the electromagnetic-wave-machining means 10 and the precision-machining means 30 to be used for the desired electromagnetic-wave machining and/or precision machining. Accordingly, the hybrid ultraprecision machining device of the present invention comprises a control means (e.g., "computing means" to be described below) for controlling the electromagnetic-wave-machining means and/or the precision-machining means, based on the information on the shape of the workpiece, the shape being measured by the shape-measuring means. By way of example, upon performing the electromagnetic-wave machining and/or precision machining, the shape and/or position of the workpiece are/is measured by the shape-measurement means 50 in real time, and the measured data is utilized by the machining means. For example, data for a correction machining is created, based on "data measured by the shape-measurement means" and "data on a machining path of the electromagnetic-wave-machining means and/or the precision-machining means, the path being obtained from a model for the micro-machined product". The electromagnetic-wave machining and/or precision machining are/is performed based on the created data for the correction machining. See FIG. 11(b). The hybrid ultraprecision machining device of the present invention preferably includes a computing means for creating the data for the correction machining.

Figure 12:
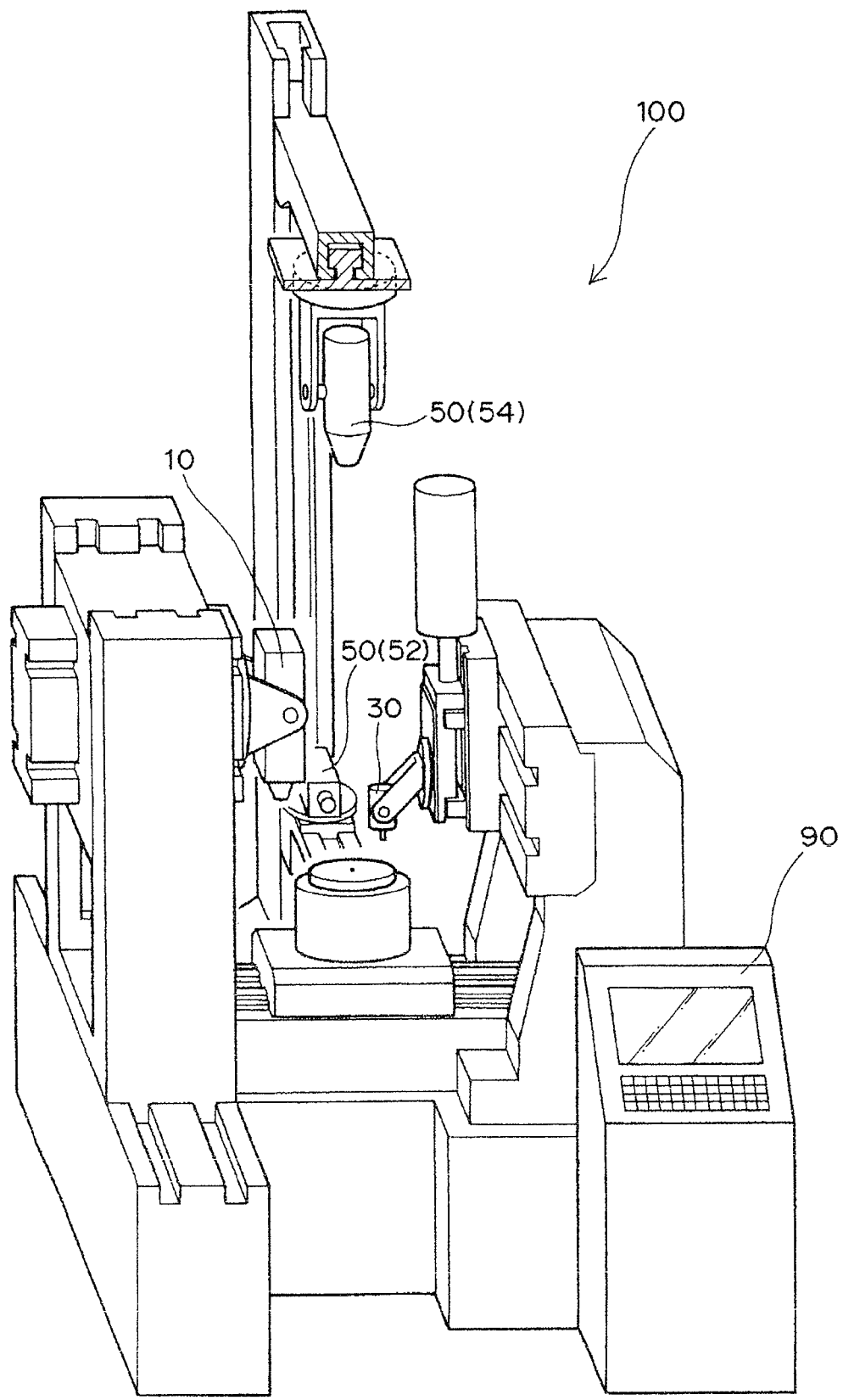
FIG. 12 is a perspective view schematically showing a computing means having a form of a computer.

The computing means may be for example in a form of a computer 90, as shown in FIG. 12. For example, it is preferred that the computer as the computing means is composed at least of a CPU, a primary storage device and a secondary storage device. The "data on a machining path of the electromagnetic-wave-machining means and/or the precision-machining means, the path being obtained from a model for the micro-machined product" stored in the storage device(s) of the computer is compared with the "data measured by the shape-measurement means". Then, a difference between these data is calculated, and thereby the data for the correction machining is provided. By way of example, during or after the machining process, the shape of the workpiece is measured to store the relationship between the workpiece material and the amount of deformation (error) as a database, whereby such database for the correction machining may be automatically created. It is preferred that the computing means can automatically create the machining path (particularly, the hybrid machining path) for the electromagnetic-wave machining means and/or precision machining means by a computation of numerical values from the model shape of the micro-machined product and the shape of the workpiece.

Figure 13A:
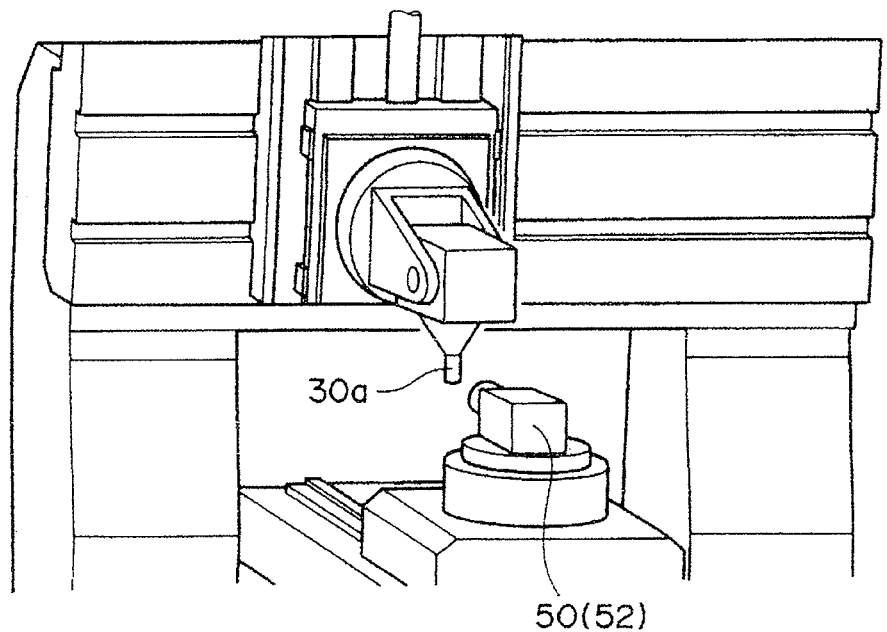
FIG. 13A is a perspective view schematically showing an embodiment wherein a shape/position of the tip of tool is measured.
Figure 13B:
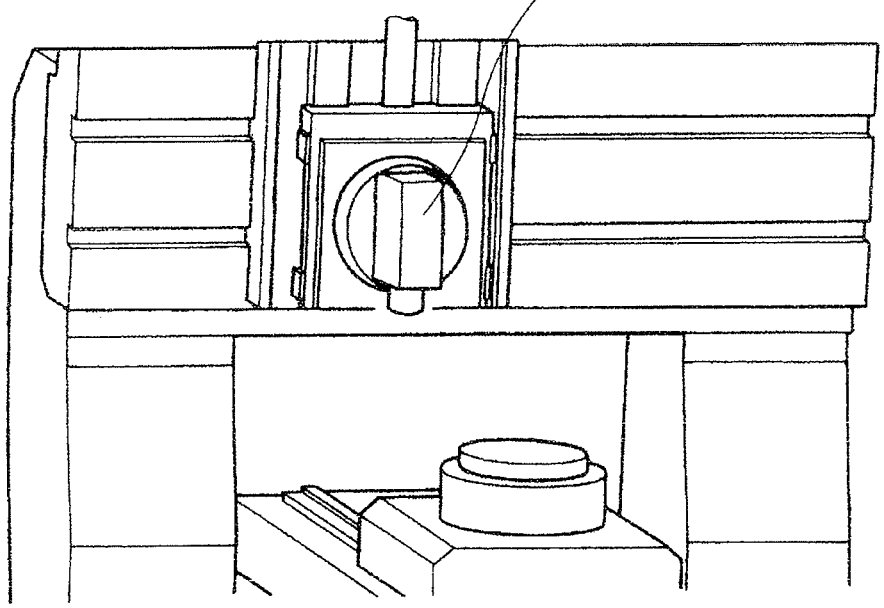
FIG. 13B is a perspective view schematically showing an embodiment wherein a shape-measurement means is provided movably in a vertical direction.

The shape-measurement means 50 may measure not only the shape and/or position of the workpiece, but also the shape and/or position of the tip 30a of the tool blade (see FIG. 13(a)). Even in this case, the resulting data and information are fed back to the electromagnetic-wave machining means 10 and/or the precision-machining means 30 to be used for the desired electromagnetic-wave machining and/or precision machining. For the onboard measurement, the shape measurement-means 50 may be provided movably in the vertical direction, as shown in FIG. 13(b).

The hybrid ultraprecision machining device 100 of the present invention can be embodied in various embodiments. Preferred embodiments of the present invention will be described below by way of example.

Embodiment of Synchronization Control

Figure 14:
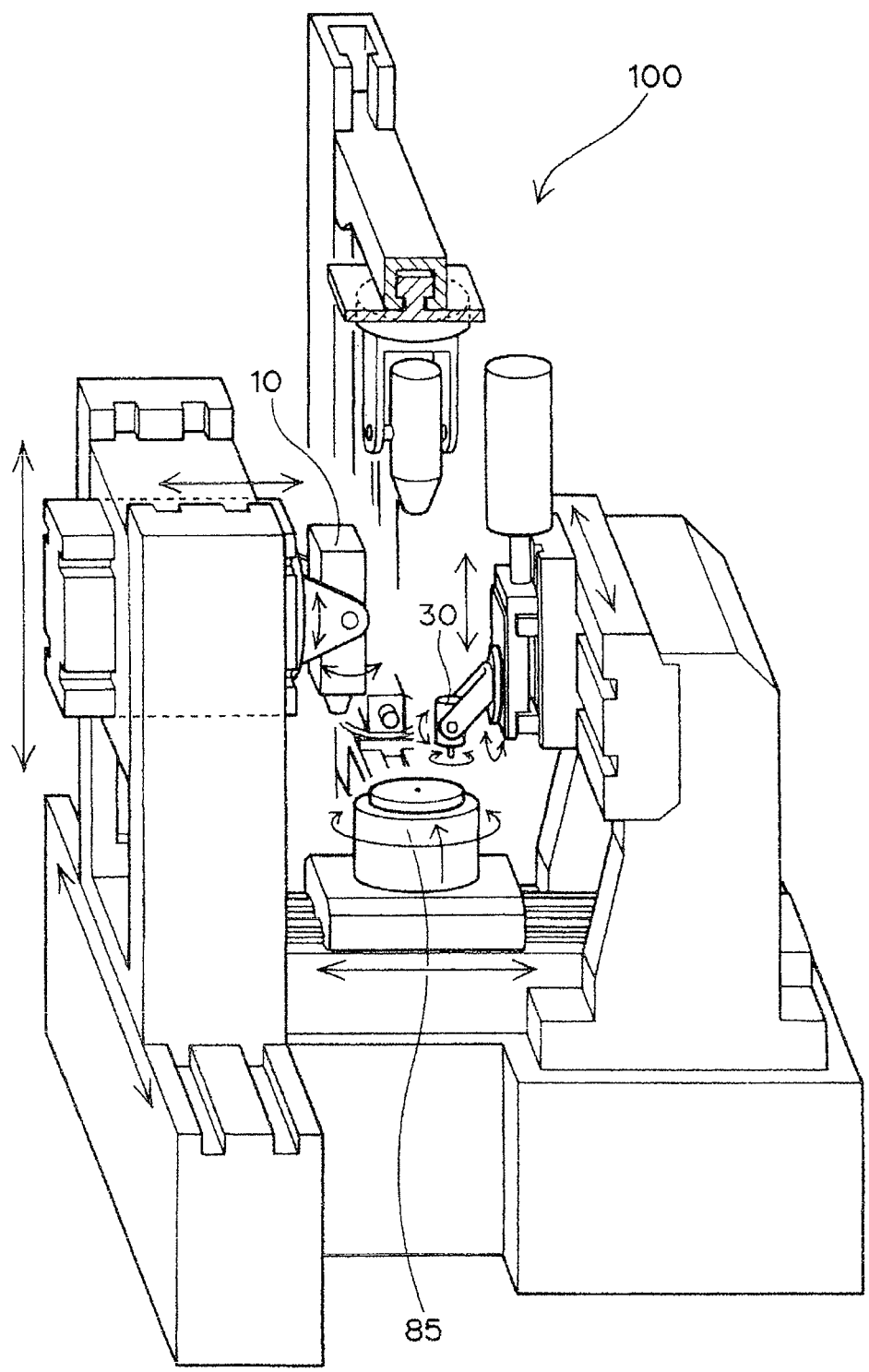
FIG. 14 is a perspective view schematically showing an embodiment wherein "operation of at least one axis of a table for mounting the workpiece" and "operation of at least one axis of a precision-machining means and/or an electromagnetic-wave-machining means" are controlled in synchronization with each other.

According to this embodiment, the hybrid ultraprecision machining device further comprises a controller for controlling an operation of at least one axis of a table for mounting the workpiece and an operation of at least one axis of a precision-machining means and/or an electromagnetic-wave-machining means in synchronization with each other. That is, as shown in FIG. 14, the controller is used for controlling the movement of the table 85 for mounting the workpiece in at least one direction, and also the movement of the precision machining means 30 and/or electromagnetic wave machining means 10 in at least one direction. Such controller may be provided in the above computing means, and thus may be for example in a form of the computer 90 (see FIG. 12). The controller of the hybrid ultraprecision machining device can furthermore shorten the machining time.

Embodiment of Movability Regarding Laser Machining

Figure 15:
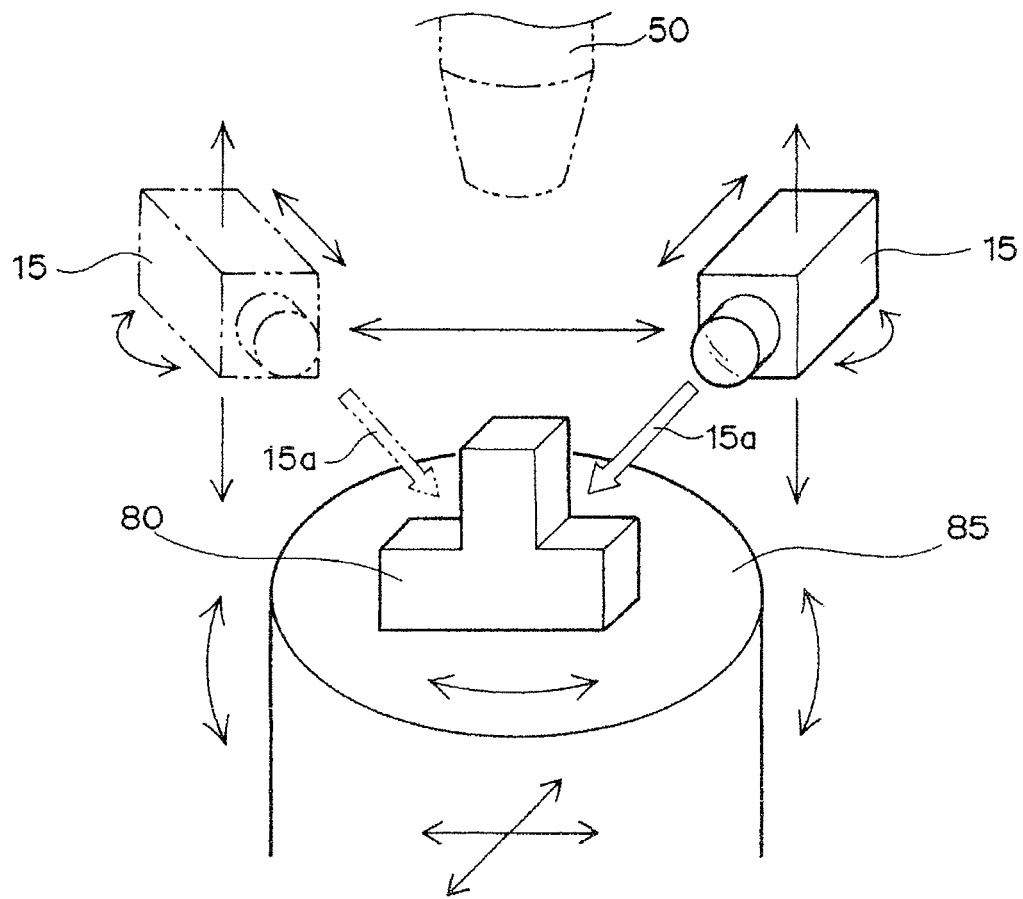
FIG. 15 is a perspective view schematically showing an embodiment wherein an angle of a laser incident light from a laser-machining means is adjustable with respect to a workpiece.
Figure 16:
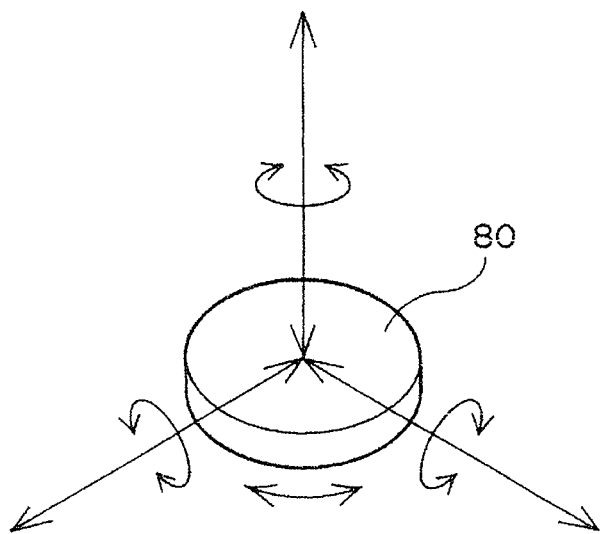
FIG. 16 is a perspective view schematically showing an embodiment wherein a workpiece is provided in a movable state along axes of a rotation direction, a horizontal direction and/or a vertical direction (e.g., workpiece in the movable state along maximum 6 axes as shown in FIG. 16).

According to this embodiment, a table 85 for mounting the workpiece 80, and/or the laser-machining means 15 are/is movable as shown in FIG. 15, and thereby an angle of a laser incident light 15a from the laser-machining means is adjustable with respect to the workpiece 80. This makes it possible to more suitably manufacture the micro-machined product with its desired shape. The movable table 85 for mounting the workpiece 80 thereon has various moving mechanisms (for example, a cam mechanism or the like) allowing the workpiece 80 to move for example in the rotation direction, horizontal direction and/or vertical direction (see FIG. 16). The table may be movable so that it is in a tilted state. Likewise, the movable laser machining means 15 preferably has various moving mechanisms allowing the laser head or the like to move in the rotation direction, horizontal direction and/or vertical direction, for example.

Embodiment of Various Different Types of Laser in Laser Machining Means

According to this embodiment, the laser-machining means comprises a plurality of laser generators which are capable of generating different laser wavelengths from each other. That is, the hybrid ultraprecision machining device is equipped with a plurality of laser devices thereon, and thereby an optimal wavelength from among a plurality of laser wavelengths can be selected according to the material of the workpiece. This makes it possible to increase the flexibility in material of the workpiece. For example in a case where a metal mold for micro-lens array is manufactured as the micro-machined product, it is preferred that a laser device capable of generating a laser beam with a wavelength of 500 nm to 1100 nm, and another laser device capable of generating another laser beam with a wavelength of 200 nm to 400 nm are provided. In another case where a micro-lens array is manufactured as the micro-machined product directly from the workpiece made of glass or plastic material, a laser device capable of generating a laser beam with a wavelength of 300 nm to 1100 nm and a pulse width of several tens of ps to several hundreds of fs may be provided.

[Hybrid Ultraprecision Machining Method of the Present Invention]

The method of the present invention is a hybrid ultraprecision machining method for manufacturing a micro-machined product from a workpiece. The hybrid ultraprecision machining method comprises:

(i) subjecting the workpiece to an electromagnetic-wave-machining process, and thereby roughly machining the workpiece; and (ii) subjecting the workpiece which has been the roughly machined in the step (i) to a cutting process selected from the group consisting of a planar machining, a shaper machining, a fly-cut machining, a diamond-turning machining and a micro-milling machining, and thereby precisely machining the roughly machined workpiece, wherein, a shape of the workpiece is measured upon at least one of the steps (i) and (ii).

Figure 2:
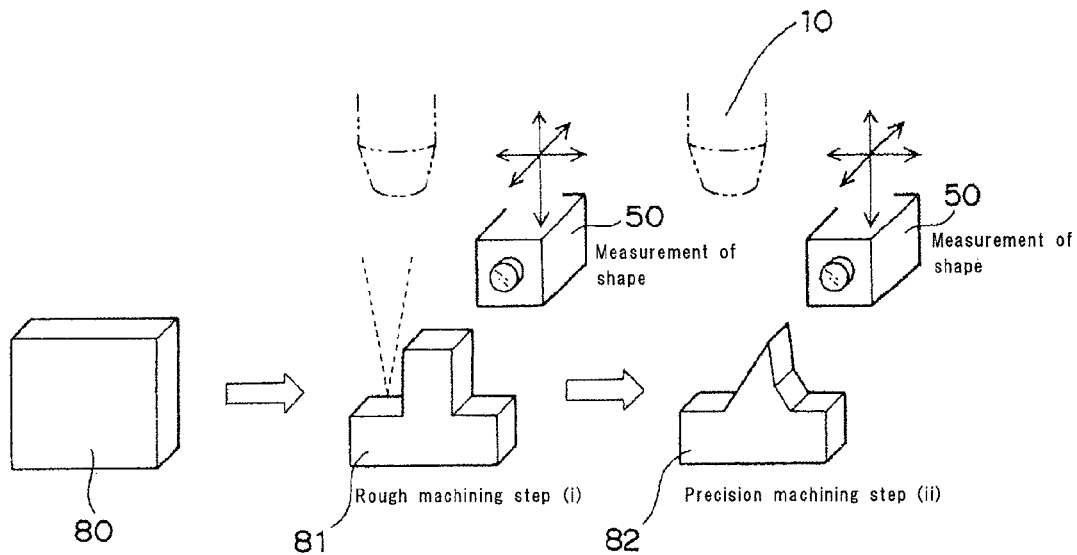
FIG. 2 is a schematic view for explaining characterizing features of the present invention.

The hybrid ultraprecision machining method of the present invention is characterized in that the workpiece is firstly subjected to the rough machining process of the electromagnetic wave machining, and then the roughly machined workpiece is subjected to the precision machining process to provide the micro-machined product, and upon the rough machining process and/or precision machining process the shape of the workpiece is measured (see FIG. 2). This characterizing feature makes it possible to increase the lifetime of the cutting tool, and also to significantly reduce the machining time as a whole. For example, the hybrid ultraprecision machining method of the present invention can shorten the processing time by about 50% to about 80%, preferably by about 60% to about 80% and more preferably by about 70% to about 80% as compared to the case of prior art wherein the micro product with the fine structure is manufactured from the difficult-to-cut material only by performing a cutting process. The present invention makes it possible to not only achieve the significant reduction of the machining time by the electromagnetic wave machining serving as the rough machining, but also achieve higher accuracies of the surface roughness and shape by the precision machining using a replaceable cutting tool together with an onboard measurement. Furthermore, the present invention makes it possible to reduce the number of necessary tools, as compared to the case of prior art wherein the micro product with the fine structure is manufactured from the difficult-to-cut material only by performing the cutting process. Specifically, the number of tools to be required in the case of prior art is larger, and specifically such number is for example about 5 to about 7. While on the other hand, the number of tools required in the method of the present invention is only two or three due to the characterizing feature that the rough machining of the electromagnetic wave machining is performed prior to the use of the cutting tool. That is, more effective machining can be achieved in the hybrid ultraprecision machining method of the present invention.

Similarly to the hybrid ultraprecision machining device, the term "hybrid ultraprecision machining" as used herein is intended for such an embodiment that the micro product with the fine structure is manufactured by "electromagnetic wave" and "precision machine", the dimension of the micro part of the product being in the range of several tens of nm to several mm, that is, in the range of about 10 nm to about 15 mm or about 10 nm to about 3 mm, more specifically in the range of several tens of nm to several tens of μm such as 10 nm to 500 μm and about 50 nm to 1 μm or about 1 nm to about 1 μm in some cases. Thus, the term "ultraprecision machining" as used herein substantially means such an embodiment that an accurate machining of the workpiece is performed such that the machined workpiece has the micro part dimension of several tens of nm to several mm as described above. In particular, the term "hybrid" as used herein substantially means a combination of two types of machinings, namely, "electromagnetic-wave machining" and "precision-machining".

As such, the hybrid ultraprecision machining method of the present invention is particularly appropriate for the manufacture of the micro product with the fine structure having the dimension of several tens of nm to several mm, that is, in the range of about 10 nm to about 15 mm, or about 10 nm to about 3 mm (for example in the range of several tens of nm to several tens of μm such as 10 nm to 500 μm and 50 nm to 1 μm, or in some cases 1 nm to 1 μm). The micro product with the fine structure to be manufactured may have a complicated multi-surface shape or curved-surface shape. Examples of the micro product with the fine structure (that is, the product that can be manufactured by the method of the present invention) may include a metal mold for optical lens (for example, a metal mold for micro-lens array), a metal mold for glass lens, a metal mold for precision-injection molding, a metal mold for precision-metal machining) in a case where the workpiece is made of ultrahard materials (cemented carbide), or metal materials such as hardened steel (quenched steel), non-iron (e.g., Bs, Cu, and/or Al) and preharden steel. Furthermore, the method of the present invention makes it possible to directly manufacture the products which are generally obtained by the above metal molds. For example, an optical lens (e.g., micro-lens array), a water-repellent plate, a mirror and a precision part can be manufactured, in which case the workpiece may be made of plastic material, metal material (e.g., aluminum steel), silicon material, glass material, mineral material, or polycrystalline diamond material. As such, the hybrid ultraprecision machining method of the present invention, which can manufacture the micro-machined product from the above workpiece, does not limit the materials of the workpiece, and can perform a hybrid ultraprecision machining on the workpiece of inorganic materials (e.g., glass material and/or metal material), or on the workpiece of organic materials (e.g., polymer material).

The hybrid ultraprecision machining method of the present invention is carried out firstly by performing the step (i). That is, the workpiece is subjected to the electromagnetic-wave-machining process to roughly machine the workpiece. By roughly machining the workpiece, most of a workpiece body is removed. For example, a ratio of the removed part from the workpiece to the whole thereof is preferably in the range of 70 to 95 volume %, more preferably in the range of 80 to 95 volume %, and still more preferably in the range of 90 to 95 volume %.

A laser is preferably used for the electromagnetic-wave machining. That is, it is preferred that most part of the workpiece is removed by irradiating the workpiece with the laser light. It is preferred that the type of the laser to be used is a solid-state laser, a fiber laser, a gas laser, or the like.

The wavelength of the laser light is preferably selected according to the material of the workpiece. For example in a case where a metal mold for micro-lens array is manufactured as the micro-machined product from the workpiece of metal material, it is preferred that the workpiece is irradiated with a laser beam with a wavelength of 500 nm to 1100 nm, or with another laser beam with another wavelength of 200 nm to 400 nm. In another case where a micro-lens array is manufactured as the micro-machined product directly from the workpiece made of glass or plastic material, it is preferred that the workpiece is irradiated with a laser beam with a wavelength of 300 nm to 1100 nm under such a condition that a pulse width is several tens of ps to several hundreds of fs.

Figure 17:
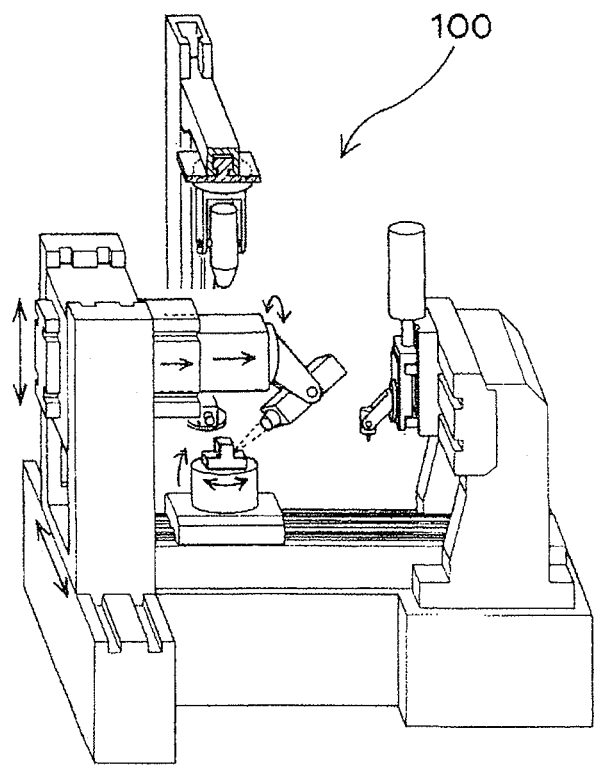
FIG. 17 is a perspective view schematically showing an embodiment wherein an orientation of the laser irradiation and/or a workpiece are/is adjusted according to a divergence angle or collection angle of laser, and thereby a vertical surface of the workpiece is machined.
Figure 17:
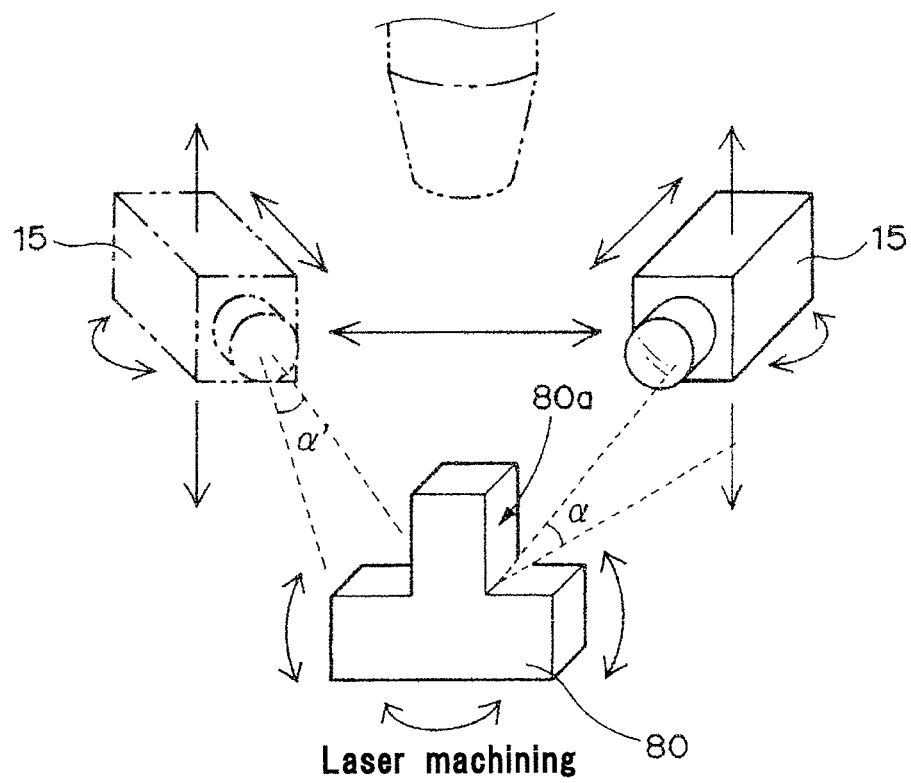

Upon the laser irradiation, the table 85 for mounting the workpiece 80, and/or the laser-machining means 15 are/is may be moved so that an angle of a laser incident light 15*a* from the laser-machining means is adjusted with respect to the workpiece 80, as shown in FIG. 15. This makes it possible to more suitably manufacture the micro-machined product with its desired shape. For example, "corner cutoff" can be effectively performed. A vertical surface 80*a* of the workpiece 80 (or approximately vertical surface or small-tapered surface of the workpiece) can be machined by adjusting the orientation(s) of the laser irradiation and/or the workpiece according to a divergence angle $\alpha'$ or collection angle $\alpha$ of the laser irradiation (see FIG. 17).

Subsequent to the step (i), the step (ii) is performed. That is, the roughly machined workpiece is subjected to the cutting process selected from the group consisting of a planar machining, a shaper machining, a fly-cut machining, a diamond-turning machining and a micro-milling machining to precisely machine the roughly machined workpiece.

Specifically, the roughly machined workpiece is subjected to a cutting process under the cutting order of nm (for example, about 10 nm to 5000 nm, or about 50 nm to 1000 nm) so that the desired micro product with the fine structure is provided. It is particularly preferred that the precision machining of the step (ii) is performed to produce the micro product with the fine structure having a surface roughness Ra of several nm to several hundreds of nm (for example, surface roughness Ra of about 2 nm to about 200 nm).

The precision machining of the step (ii) is performed by using the replaceable cutting tool selected from the group consisting of the planar tool, the shaper tool, the fly-cut tool, the diamond-turning tool and the micro-milling tool. Such cutting tools are the same as ones as described above.

It is preferred in the step (ii) that at least one cutting process selected from the group consisting of the shaper machining, the fly-cut machining, the diamond-turning machining and the micro-milling machining is performed.

Figure 18:
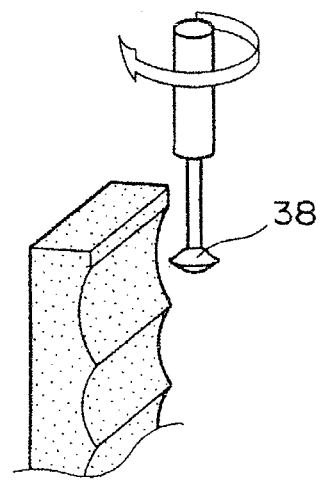
FIG. 18 is a perspective view schematically showing a grinding tool/grinding machining.
Figure 18:
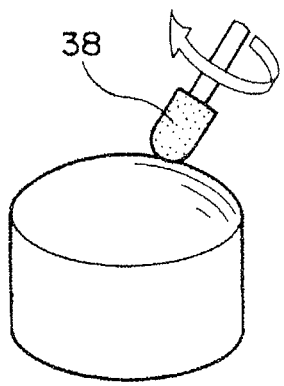
Figure 18:
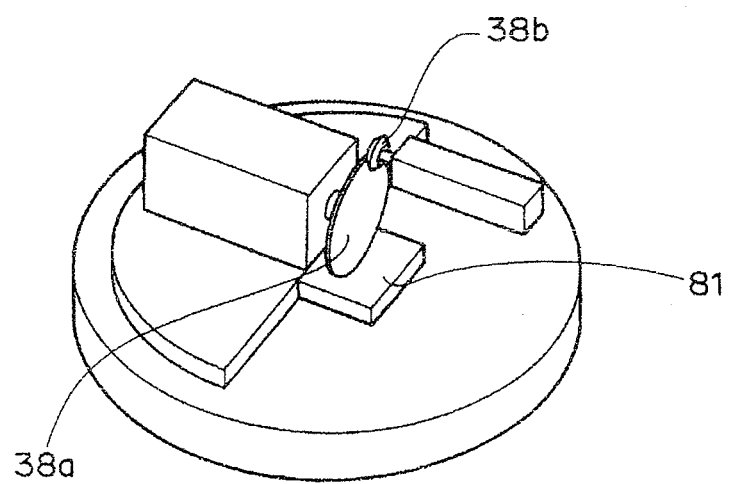

A grinding process in addition to the cutting process is performed in the precisely machining of the step (ii). That is, the workpiece may be subjected to the precision machining using a grinding tool equipped with a grindstone or the like. This makes it possible to achieve the machining with higher accuracy. For example, as shown in FIG. 18, the grinding of the surface of the workpiece 81 can be performed by bringing a rotating grindstone tool 38 into contact with the workpiece 81.

Figure 10:
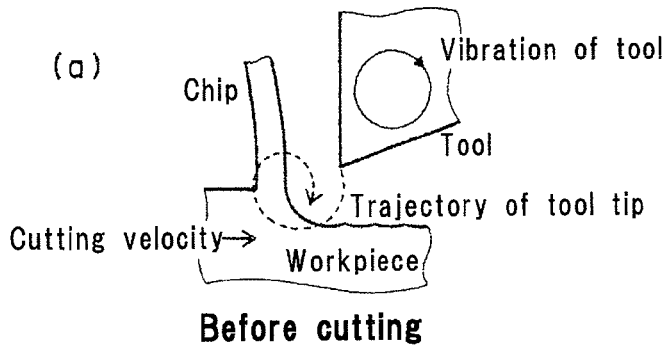
FIGS. 10(a), 10(b), 10(c) and 10(d) are perspective views schematically showing a vibration cutting.
Figure 10:
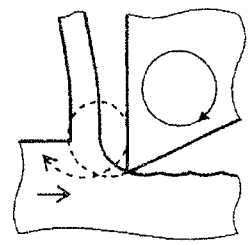
Figure 10:
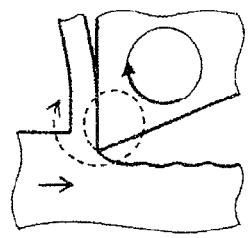
Figure 10:
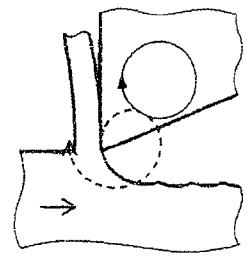

The workpiece is at least subjected to a vibration cutting process. That is, the precision machining may be performed while keeping a vibration state of the cutting tool. This makes it possible to provide the effects of "decreasing a cutting resistance", "preventing an adherence phenomenon in the tip edge of the tool blade" and "suppressing a distortion attributed to thermal action". As shown in FIG. 10, an ultrasonic wave elliptical vibration cutting is preferably performed wherein the tip edge of the cutting tool is vibrated elliptically. For example, the machining process is preferably performed while providing the tip edge of the cutting tool with the ultrasonic wave under the conditions of vibration amplitude of 1 μm to 50 μm and frequency of 90 kHz to 150 kHz. The ultrasonic wave elliptical vibration cutting leads to an effective achievement of a large reduction in the cutting resistance, a suppression of the generation of burr and chatter vibration, and a reduction in thickness of the chip.

Upon at least one of the steps (i) and (ii), it is preferred that an operation of at least one axis of a table for mounting the workpiece (for example, preferably the operation of the maximum 6 axes in the rotation direction, horizontal direction and vertical direction) and an operation of at least one axis of a precision-machining means and/or an electromagnetic-wave-machining means (for example, preferably the operation of the maximum 6 axes in the rotation direction, horizontal direction and vertical direction) are controlled in synchronization with each other. That is, as shown in FIGS. 14 to 17, it is preferable to control the movement of the table 85 for mounting the workpiece in at least one direction, and also the movement(s) of the precision machining means 30 and/or electromagnetic wave machining means 10 (15) in at least their one direction. This makes it possible to furthermore shorten the machining time.

Figure 19:
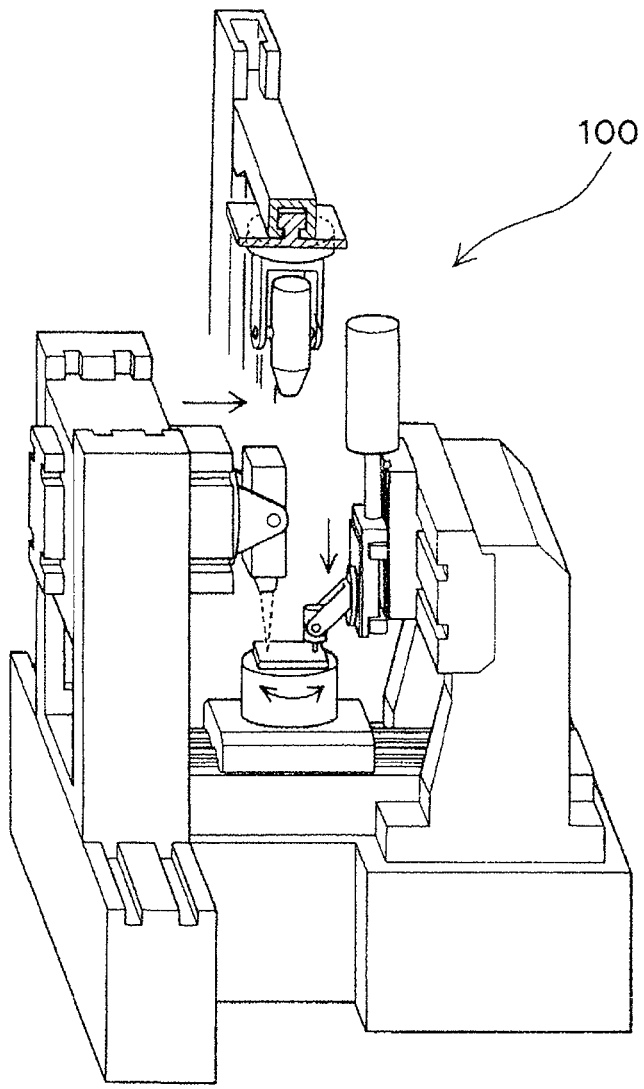
FIG. 19 is a perspective view schematically showing an embodiment wherein "step (i) of rough machining performed by electromagnetic-wave machining" and "step (ii) of precision machining" are concurrently performed.
Figure 19:
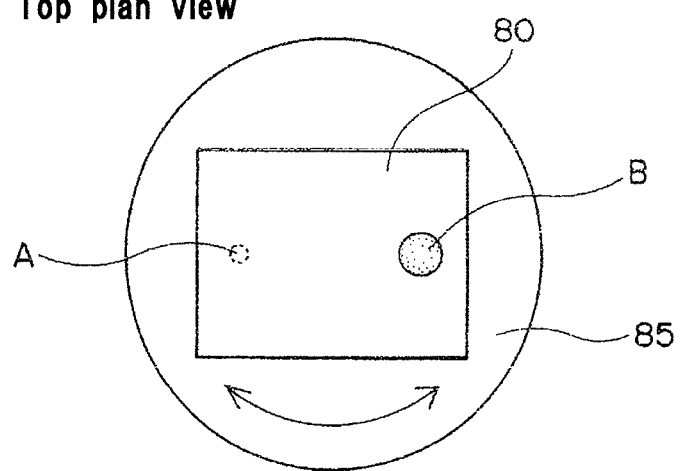

The step (i) and the step (ii) may be substantially performed concurrently. That is, "step (i) of rough machining performed by electromagnetic-wave machining" and "step (ii) of precision machining" may be concurrently performed. More specifically, as shown in FIG. 19, a part of the workpiece 80 may be roughly cut by the electromagnetic wave machining, whereas another part "B" of the workpiece 80 which has been already roughly cut may be subjected to the precision machining. As shown in FIG. 19, the workpiece may be subjected to both of the rough machining and the precision machining at the same time by implementing a rotation of the mounting table 85, for example.

In the hybrid ultraprecision machining method of the present invention, a shape of the workpiece is measured upon at least one of the steps (i) and (ii). In other words, upon at least one of "step (i) of rough machining performed by electromagnetic-wave machining" and "step (ii) of precision machining", and thereby the step (i) and/or (ii) are/is performed based on the result of the measurement. Specifically, the shape and/or position of the workpiece are/is measured at a point in time at least one of before, during and after such machining processes.

It is preferred that information on the shape and position of the workpiece is obtained for example by "imaging means (e.g., CCD camera)" and "a detector using a laser light". The obtained information on the shape and/or position of the workpiece is fed back to the steps (i) and (ii) to be used for the desired rough machining and/or precision machining. In other words, upon performing the step (i) and/or step (ii), the shape and/or position of the workpiece are/is measured in real time, and the measured data is then utilized by the rough machining and/or precision machining. For example, data for a correction machining is created, based on "measured data" and "data on a machining path of the electromagnetic-wave-machining means and/or the precision-machining means, the path being obtained from a model for the micro-machined product", and thereafter the rough machining and/or precision machining are/is performed based on the created data for the correction machining (see FIG. 11(*b*)). This feedback control is performed suitably by the computing means which is described above, i.e., described in [Hybrid Ultraprecision Machining Device of the Present Invention]

Although a few embodiments of the present invention have been hereinbefore described, the present invention is not limited to these embodiments. It will be readily appreciated by those skilled in the art that various modifications are possible without departing from the scope of the present invention.

The present invention has been described based on such an embodiment that the precision-machining means is equipped with the replaceable cutting tool selected from the group consisting of the planar tool, the shaper tool, the fly-cut tool, the diamond-turning tool and the micro-milling tool. The present invention, however, is not necessarily limited to this embodiment. For example, the precision machining means may be equipped also with a replaceable grinding tool. That is, in addition to or instead of the above cutting tool, the grinding tool may be also replaceable in the precision machining means. The use of the grinding tool leads to an achievement of the high-precision machining. Typically, a grindstone is used as the grinding tool. The grinding of the surface of the workpiece can be performed by bringing the rotating grindstone into contact with the workpiece (see FIG. 18). Examples of abrasive grain material used for the grindstone include a diamond, a cubic crystal boron nitride (cBN), an alumina and a silicon carbide (SiC), for example. Resin bond grindstone, metal bond grindstone, or metal resin grindstone may also be used. Furthermore, the precision machining means may be equipped also with a replaceable horn for ultrasonic machining, a replaceable tool for ultrasonic vibration cutting, a replaceable grinding tool for polishing, or a replaceable micro drill.

Cutting oil for lubrication may be supplied to the tip edge of the tool in order to improve a cutting performance of the cutting tool and reduce the wear of the tool. The kind of the cutting oil is not specifically limited, and thus any suitable oils for the conventional cutting processes may be used.

EXAMPLES

Some confirmatory tests were conducted to confirm the effects of the present invention.

<<Case A>>

Figure 20A:
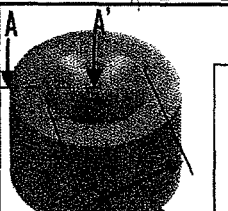
FIGS. 20A and 20B are the results regarding metal molds manufactured in "EXAMPLES" (FIG. 20A: case "A", FIG. 20B: case "B").

A machining method of the prior art (Comparative example 1) and a machining method of the present invention (Example 1) were performed to manufacture a metal mold for fresnel lens as shown in FIG. 20(a).

Comparative Example 1

As for the machining method of the prior art, only the cutting machining was performed over the whole processes in order to produce the metal mold for fresnel lens from a difficult-to-cut material. The outline on the machining method of the prior art is shown in Table 1.

TABLE 1

| | Comparative example 1 (Method of Prior Art) | | | |
|---|---|---|---|---|
| | Rough machining (Electric discharge machining) | Finishing allowance | Finishing (Cutting and Grinding) | Total |
| Machining time | — | → | 80 H | 80 H |
| Note (Problems) | Workpiece had its edge broken due to its micro shape, and electric discharge machining was impossible because its bottom was not able to be machined. | — | Processes from rough machining to finishing were performed. The number of dressing due to the wear of tool (i.e., grindstone) needed to be 10 or more. Final finishing was performed by cutting to ensure the edge of the workpiece bottom. Surface roughness Rz: 100 nm or less | |

As shown in the most right column of Table 1, it was found that the method of the prior art had taken "80 hours" to produce the metal mold for fresnel lens shown in FIG. 20(a).

Example 1

In Example 1 of the present invention, a workpiece was roughly cut by laser machining, and thereafter the roughly cut workpiece was micro-machined to produce the metal mold for fresnel lens. The outline on Example 1 is shown in Table 2. As the shape measurement means in Example 1, the arranged position of lens was measured by a CCD camera, and the shape of the workpiece was measured by optical interferometry using a laser light. For the surface roughness measurement of the workpiece, white-light interferometry measurement (optical interference) was performed.

TABLE 2

| | Example 1 (Present Invention) | | | |
|---|---|---|---|---|
| | Rough machining (Laser machining) | Finishing allowance | Finishing (Cutting and Grinding) | Total |
| Machining time | 16 H | → | 5 H | 21 H |
| Note (Effects) | It was possible to perform a rough machining of the shape which had been regarded as being impossible to be machined. This lead to a reduction of machining time. Surface roughness: Rz 3 to 10 μm Machined shape accuracy: ≤ ±10 μm | 5 μm to 10 μm | No rough cutting and no semi-finishing by grinding machining were needed. It was possible to finish-machine the workpiece only by cutting machining. Surface roughness Rz: 100 nm or less | |

As shown in the most right column of Table 2, it was found that the machining method of the present invention had taken "21 hours" to produce the metal mold for fresnel lens shown in FIG. 20(a).

It is concluded that, as for the production of the same metal mold for fresnel lens, the present invention can reduce the manufacturing time by about 74% as compared to that of the prior art (see Table 3).

TABLE 3

| Comparative example 1 Machining time | Example 1 Machining time | Rate of reduction in time |
|---|---|---|
| 80 H | 21 H | 74% |

<<Case B>>

Figure 20B:
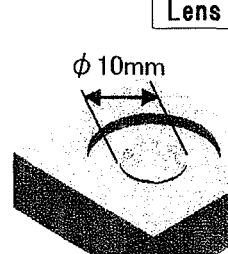

A machining method of the prior art (Comparative example 2) and a machining method of the present invention (Example 2) were performed to manufacture a metal mold for multiple lens as shown in FIG. 20(b).

Comparative example 1

As for the machining method of the prior art, the electric discharge machining was performed with respect to the workpiece, followed by the cutting machining to produce a metal mold for multiple lens from a difficult-to-cut material. The outline on the machining method of the prior art is shown in Table 4.

TABLE 4

Comparative example 2 (Method of Prior Art)

|  | Rough machining (Electric discharge machining) | Finishing allowance | Finishing (Cutting and Grinding) | Total |
|---|---|---|---|---|
| Machining time | Production of electrodes: 48 H Electric discharge machining: 40 H Total: 88 H | → 100 to 50 μm | 64 H | 152 H |
| Note (Problems) | Workpiece was inclined for each optical axis to perform electrical discharge machining. Surface roughness: Rz 2 to 4 μm |  | Positioning structure dedicated to set the metal mold was needed (in alignment with the electric discharge machining surface). Workpiece was inclined for each optical axis and subjected to grinding machining. The number of dressing due to the wear of grindstone was 32. Surface roughness: Rz 100 nm or less |  |

As shown in the most right column of Table 4, it was found that the method of the prior art had taken "152 hours" to produce the metal mold for multiple lens shown in FIG. 20(b).

Example 2

In Example 2 of the present invention, a workpiece was roughly cut by laser machining, and thereafter the roughly cut workpiece was micro-machined to produce the metal mold for multiple lens. The outline on Example 2 is shown in Table 5. As for Example 2, the shape of the workpiece was measured by optical interferometry using a laser light. For the surface roughness measurement of the workpiece, "white-light interferometry measurement" (optical interference) was performed.

TABLE 5

Example 2 (Present Invention)

|  | Rough machining (Laser machining) | Finishing allowance | Finishing (Cutting and Grinding) | Total |
|---|---|---|---|---|
| Machining time | 20 H | → | 8 H | 28 H |
| Note (Effects) | Laser axis needed to be matched with optical axis in order to ensure machining accuracy. Machining time was able to be reduced since a finishing allowance was able to be decreased and no tool matching the shape of the workpiece was needed as compared to the case of electric discharge machining. Surface roughness: Rz 3 to 10 μm Machined shape accuracy: ≤ ±10 μm | 5 μm to 10 μm | No metal mold setting step (aligning step) was needed since laser and cutting machinings were available in the same machine. Matching between optical axis and tool axis was able to be automatically controlled by multiaxis control to ensure the machining accuracy. Surface roughness: Rz 100 nm or less |  |

As shown in the most right column of Table 5, it was found that the machining method of the present invention had taken "28 hours" to produce the metal mold for multiple lens shown in FIG. 20(b).

It is concluded that, as for the production of the same metal mold for multiple lens, the present invention can reduce the manufacturing time by about 82% as compared to that of the prior art (see Table 6).

TABLE 6

| Comparative example 2 Machining time | Example 2 Machining time | Rate of reduction in time |
|---|---|---|
| 152 H | 28 H | 82% |

<<Generalization>>

As can be seen from the results of the cases A and B, the present invention can reduce the manufacturing time by 70 to 80% as compared to those of the prior art wherein the microstructure is manufactured from the difficult-to-cut material. Accordingly, it is understood that the present invention can provide significantly advantageous effects for the manufacture of the micro product with the fine structure.

INDUSTRIAL APPLICABILITY

The present invention makes it possible to provide a micro-machined product from a workpiece. In particular, there can be provided a metal mold for any kinds of parts and molded products, all of which achieve the miniaturization and high functionality.

EXPLANATION OF REFERENCE NUMERALS

10 Electromagnetic-wave-machining means
15 Laser-machining means
15a Laser incident light
30 Precision-machining means
30a Tip of tool
31 Sliding platform
32 Motor for vertical-axis movement
33 Machining head
34 Shaper tool
35 Fly-cut tool 36 Diamond-turning tool
36a Vacuum chuck
36b Air spindle
36c Induction motor
36d Servomotor
37 Micro-milling tool
38 Grinding tool
38a Grinding tool (Diamond grindstone)
38b Truing grindstone
50 Shape-measurement means
52 Shooting means/Imaging means (Shape-measurement means)
54 Detector by laser light (Shape-measurement means)
80 Workpiece
81 Roughly machined workpiece
82 Roughly machined and subsequently precisely machined workpiece (i.e., micro-machined product)
82a Micro part of micro-machined product
85 Table for mounting workpiece
90 Computing means (e.g., computer)
100 Hybrid ultraprecision machining device

The invention claimed is:

1. A hybrid ultraprecision machining device for manufacturing a micro-machined product from a workpiece, the machining device comprising:
  an electromagnetic-wave-machining means for roughly machining the workpiece;
  a precision-machining means for precisely machining the roughly machined workpiece, the precision-machining means being equipped with a replaceable cutting tool selected from the group consisting of a planar tool, a shaper tool, a fly-cut tool, a diamond-turning tool and a micro-milling tool;
  a shape-measurement means for measuring a shape of the workpiece upon use of the electromagnetic-wave machining means and the precision-machining means; and
  a control means for controlling the electromagnetic-wave-machining means or the precision-machining means, based on information on the shape of the workpiece, the shape being measured by the shape-measuring means.

2. The hybrid ultraprecision machining device according to claim 1, wherein a micro part of the micro-machined product has a dimension of 10 nm to 15 mm.

3. The hybrid ultraprecision machining device according to claim 1, wherein the precision-machining means has an additional function of vibration cutting.

4. The hybrid ultraprecision machining device according to claim 1, wherein the electromagnetic-wave-machining means is a laser-machining means.

5. The hybrid ultraprecision machining device according to claim 4, wherein a table for mounting the workpiece, and/or the laser-machining means are/is movable, and thereby an angle of a laser incident light from the laser-machining means is adjustable with respect to the workpiece.

6. The hybrid ultraprecision machining device according to claim 4, wherein the laser-machining means comprises a plurality of laser generators capable of generating different laser wavelengths from each other.

7. The hybrid ultraprecision machining device according to claim 1, further comprising a computing means for creating data for a correction machining, based on data measured by the shape-measurement means and also based on data on a machining path of the electromagnetic-wave-machining means and/or the precision-machining means, the path being obtained from a model for the micro-machined product.

8. The hybrid ultraprecision machining device according to claim 1, wherein a micro part of the micro-machined product has a dimension of 10 nm to 15 mm, and
  wherein the micro-machined product is a metal mold for an optical lens, or an optical lens.

9. A hybrid ultraprecision machining method for manufacturing a micro-machined product from a workpiece, the method comprising:
  (i) subjecting the workpiece to an electromagnetic-wave-machining process, and thereby roughly machining the workpiece; and
  (ii) subjecting the roughly machined workpiece to a cutting process selected from the group consisting of a planar machining, a shaper machining, a fly-cut machining, a diamond-turning machining and a micro-milling machining, and thereby precisely machining the roughly machined workpiece,
  wherein, a shape of the workpiece is measured upon at least one of the steps (i) and (ii), and thereby the step (i) or (ii) is performed based on the measured shape.

10. The hybrid ultraprecision machining method according to claim 9, wherein a micro part of the micro-machined product to be manufactured has a dimension of 10 nm to 15 mm.

11. The hybrid ultraprecision machining method according to claim 9, a grinding process in addition to the cutting process is performed in the precisely machining of the step (ii).

12. The hybrid ultraprecision machining method according to claim 9, wherein the workpiece is at least subjected to a vibration cutting process in the step (ii).

13. The hybrid ultraprecision machining method according to claim 9, wherein the electromagnetic-wave-machining process of the step (i) is performed by irradiating the workpiece with a laser.

14. The hybrid ultraprecision machining method according to claim 13, wherein an orientation of the laser irradiation and/or the workpiece are/is adjusted according to a divergence angle of the laser, and thereby a vertical surface of the workpiece is machined.

15. The hybrid ultraprecision machining method according to claim 9, wherein an operation of at least one axis of a table for mounting the workpiece and an operation of at least one axis of a precision-machining means and/or an electromagnetic-wave-machining means are controlled in synchronization with each other.

16. The hybrid ultraprecision machining method according to claim 9, wherein a micro part of the micro-machined product to be manufactured has a dimension of 10 nm to 15 mm, and
  wherein a metal mold for an optical lens, or an optical lens is manufactured as the micro-machined product.

* * * * *